United States Patent [19]

Robertson et al.

[11] Patent Number: 5,670,984

[45] Date of Patent: Sep. 23, 1997

[54] IMAGE LENS

[75] Inventors: George G. Robertson, Foster City; Jock D. Mackinlay, Palo Alto, both of Calif.

[73] Assignee: Xerox Corporation, Stamford, Conn.

[21] Appl. No.: 143,323

[22] Filed: Oct. 26, 1993

[51] Int. Cl.$^6$ .................................................. G09G 00/00
[52] U.S. Cl. ........................ 345/139; 345/127; 395/125
[58] Field of Search .................................... 345/127, 128, 345/129, 130, 139, 136, 126; 595/119, 125, 139, 138, 157, 127; 382/285, 298; 395/127

[56] References Cited

U.S. PATENT DOCUMENTS

| | | | |
|---|---|---|---|
| 4,384,338 | 5/1983 | Bennett | 345/139 |
| 4,682,217 | 7/1987 | David | 345/139 |
| 4,790,028 | 12/1988 | Ramage | 382/47 |
| 4,800,379 | 1/1989 | Yeomans | 340/731 |
| 4,885,702 | 12/1989 | Ohba | 364/521 |
| 5,339,390 | 8/1994 | Robertson et al. | 395/157 |
| 5,341,466 | 8/1994 | Perlin et al. | 395/139 |

FOREIGN PATENT DOCUMENTS 0 399 663  11/1990  European Pat. Off. ........ G06F 15/72

2 139 846  11/1984  United Kingdom .......... H04N 15/72

OTHER PUBLICATIONS

Peterson, S.P., et al., "Human Factors in Computing Systems Reaching Through Technology", *CHI'91 Conference Proceedings*, New Orleans, LA, pp. 173–179, Apr. 27–May 2, 1991.

Sarkar, Manojit, et al., *Graphical Fisheye Views of Graphs*, CHI, 1992 (Monterey, CA, May 3 –May 7, 1992), ACM, New York, 1992, pp. 23–35.

Brown, Marc H., et al., *Graphical Fisheye Views of Graphs 84b (Videotape)*, Digital Research Center Reports, Jul. 1, 1992.

*Primary Examiner*—Xiao Wu
*Attorney, Agent, or Firm*—Philip H. Albert; Townsend and Townsend and Crew

[57] ABSTRACT

A method for displaying an image on a display surface which preserves context and detail information when the image is compressed to fit onto a display surface. The image is transformed from a plane onto a truncated pyramid, and then a three-dimensional perspective projection of the pyramid is taken. This perspective provides a detailed view of portions of the image underlying an image lens panel, and context view of remaining portions of the image, which underlie side panels. The side panels are rotated and expanded to fill the remainder of the view after the detailed image under the image lens is expanded.

15 Claims, 8 Drawing Sheets

IMAGE LENS

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

CROSS REFERENCE TO RELATED APPLICATIONS

A related application in the field of visual displays of information, U.S. application Ser. No. 08/144,238, filed Oct. 27, 1993 entitled "PERSPECTIVE SHEET", is assigned to the same assignee as the present application, and is incorporated herein by reference for all purposes.

BACKGROUND OF THE INVENTION

The present invention relates to the field of visual displays of information. More specifically, the invention solves the problem of how to display an image containing large amounts of information on a display where the image is too large to be displayed in its entirety at full resolution.

For the purposes of this application, several variations on an image will be defined. An image is a visual display of information, or a logical representation of what is to become a visual display of information. An image could be, but is not limited to, a text document, a map, or a graph. The underlying information contained in an image depends on its form. For example, information in a text document includes the information content of its words, the information content of the positions of the words within the document, and the information content of text formatting and fonts, etc. Information has many aspects, but two aspects are of particular concern here: detail and context. Detail information in a text document image indicates which local information such as which fonts are used and which characters are present in a local area of the image, while detail information in a map indicates the symbols used on the map and the path taken by a road (in the case of road maps). Context information, on the other hand, places these details in perspective with the other information of the total image.

An image standing alone, by definition, contains all the information content of that image. When an image contains too much information to be displayed all at once on a given display device, a substitute image comprising less than all the information content of the "full" image must be accepted. The term "full image" will be used herein to refer to an original image, before any information-losing operations are applied to the image to form a displayable substitute image. Of course, such a substitute image could just as well be a full image for a yet lower resolution display, however for simplicity, full images will be assumed to be ideal in that they contain all the information necessary to display the full image on an ideal display (i.e., infinite resolution, size, color, etc.).

When the full image is undisplayable in its entirety, the displayable image which is substituted for the full image is often either a detail image or a global image, or a combination of the two. A global image is the full image with resolution removed to allow the entire image to fit onto the display surface of the display device. Of course, the resolution might be so low that details are not available from this substituted image. A detail image shows the details, but only of a portion of the full image. With a detail image, the details of the image are available, but the global context of the details are lost. If a combination is used, the connection between the detail image and the global image will not be visually apparent, especially where the detailed image obscures more of the global image than is shown in the detailed image.

A display device or display system, as used herein, could be a computer monitor, printer, or the like, however computer monitors are more suitable for interactive displays of images. Where image processing is required, a display system will often include an image processor or other computer system. A display device might also be a device which behaves as if it displayed images but does not actually display the images. For example, a facsimile machine might manipulate images much the same manner as a computer display, but doesn't necessarily display an image, instead providing the image to another system which does display the provided image.

Due to the growth of computing power, users are demanding more and more information from computers, and want the information provided in a visually informative form. Take, for example, a business planner who is deciding where to locate a retail outlet. While it was at one time acceptable to work from a long print-out of numbers from a database showing population centers and the distances between them, now graphical two-dimensional ("2D") displays of the data overlaid on geographical data is expected. This output might be part of a geographical information system (GIS), which are well known.

The problem with such 2D displays is that a full image which is moderately complex cannot be displayed all at once with the detail necessary, due to the resolution of the information in the image and the resolution and size of the display surface. Often, a user must chose between a global image and a detail image. Generally, this global/context versus detail/focus tradeoff exists wherever context is important and the full image is moderately complex.

For example, if the full image is a multi-page document and locations of occurrences of a text string in the document are important, an image of the document might be displayed, with the occurrences highlighted. If the image of the entire document can be displayed and still be readable, detail and context are fully available. But, if the full image cannot be displayed, the user must often choose between an unreadable global image showing the context and readable detail images which lack global context information.

One partial solution is to display detail images over a global image, with the global image possibly including an indication of where the detail image fits into the full image. This approach is less than desirable, since the detail image is detached from the global context, and consequently a user viewing the images will need to jump back and forth visually between the global and detail images to observe both the details and the context of the information presented in the detail image. This would be quite difficult where many details, such as text or lines, extend beyond the edge of the detail image.

This problem is illustrated in FIG. 1. FIG. 1 shows three views of a full image 10, an image of a document containing the text of a sentence. FIG. 1(a) shows the full image, and the text in image 10 is readable (i.e., it displays all the information content of the document), but in any real application, the document to be imaged will be much longer and its text will have to be compressed to much smaller resolutions. In such a case, the text might not be completely readable (i.e., information embodied in the text will be lost)

without magnification. FIG. 1(b) shows the effect of magnification of a region 13 of image 10 into a detail image 14, which is effected by magnifier 12. As a result of the magnification of region 13, other areas of image 10 are obscured, and the context of detail image 14 is lost due to the discontinuity between region 13 and image 10. Note that the discontinuity occurs at the edge of magnifier 12.

The obscuring and loss of context occurs with both physical magnifiers and logical magnifiers, and the cause is shown in FIG. 1(c). FIG. 1(c) illustrates the view from a viewpoint 16 through magnifier 12 to region 13. Since magnifier 12, in effect, brings region 13 closer to viewpoint 16, the solid angle subtended by the advanced region is larger and corresponds to the bounds of an obscured region 18 in image 10.

U.S. Pat. No. 4,790,028 describes an attempt to solve the problem of magnified areas obscuring global images, by using a "variably-scaled" display. In such a display, the full image is distorted such that the coordinates of an area of interest are expanded while the coordinates of the area just outside the area of interest is correspondingly compressed; the compressed portions and the remaining portions of the image are displayed with loss of information, with the loss being greater in the compressed area. However, this approach is computationally unwieldy, which results in slow response times to a user's request for amplification of detail, and is also unsuitable where the information content of the image includes text, which would be distorted to prevent easy reading, or includes characteristics of lines, such as their straightness, distances and relative angles of intersection. Furthermore, such a system does not take into effect the context information which may be preserved if compression is graduated from a lower compression near a detail image to a higher compression in more peripheral areas.

From the above it is seen that an improved system for displaying an image where both amplification of detail and context preservation of that detail within an image is needed.

SUMMARY OF THE INVENTION

An improved display system which preserves context while providing detailed focus is provided by virtue of the present invention.

In one embodiment of the present invention, a full image is presented as a lensed panel detail image and side panel images. The lensed panel contains a view of a portion (possibly all) of the full image to a desired resolution, surrounded by side panel images which show global context and are continuous with the lensed panel and adjacent side panel images. The maximum resolution of the panel images is determined by how much display surface area is taken up by the lensed image, the location of the lensed image within the full image, and the area taken up by the full image. Taken together, the lensed panel image and the side panel images can occupy substantially all of a display surface with a global image containing all of the context of an full image, but which might leave off some detail in peripheral portions of the image.

In a specific embodiment, the full image is rectangular, the lensed panel is rectangular and parallel with the edges of the full image and the side panels are trapezoids. In this embodiment, the transformation of a full image into a lensed panel image and four panel images (top, bottom, left, and right), which together form a rectangle, is done by diving the full image into panels, mapping the panels onto a three-dimensional ("3D") truncated pyramid (the lensed panel is the top of the truncated pyramid) and then projecting the truncated pyramid into a viewing volume.

The viewing volume is a 3D perspective projection with respect to a viewpoint. The user first views the image as a global image flush with a constant Z plane, with the lensed panel lying under an image lens unmagnified. As the image lens is brought toward the viewer (i.e., the viewpoint; in a positive Z direction) the image lens and the lensed panel image appear larger in the viewing plane, and the side walls of the pyramid tilt more to accommodate the reduced space allotted to the panel images. In a specific embodiment where the image is the text of a document, the image lens might be referred to as a "document lens", however an image lens or document lens will work equally well with other images, such as maps, blueprints, and large engineering drawings.

The detail required in the lensed panel image and the context-preservation and compression of the side panel images are automatically provided by the 3D transformations of the full image. To do the transformations, the dimensions of the full image, the truncated pyramid, the viewing plane, and viewpoint are all described within the display system by coordinates in a common 3D space. The particular coordinates used are determined by the relative resolution of the lensed panel image and the global image, where the lens is located on the full image, and how the user manipulates user controls provided to adjust these parameters. The viewpoint is a point above the truncated top of the pyramid, but in some embodiments, the viewpoint moves around based on the movement of the image lens in order to keep the lensed panel in view.

In an interactive embodiment, a user manipulates an input device, such as a mouse or a keyboard, to move the image lens over the global image and to increase the magnification of the lensed panel, which are the visual equivalents of sliding the image lens around the image and bringing the image lens closer to the user. The interactive embodiment might also provide a means for adjusting the size of the image lens in much the same way as a window is resized.

The response time for the user commands in the interactive environment is quick, since the transformations are simple linear transformations. If available, the transformations of the image from 2D to 3D and back are performed with hardware especially suited to manipulating 3D graphics images. The system is also made quicker by generating and combining all the necessary transforms, and then rendering the objects of the full image through the combined transform. Where the objects are text, further improvements are possible using greeked text for the side panels.

Image lenses can also be nested.

A further understanding of the nature and advantages of the inventions herein may be realized by reference to the remaining portions of the specification and the attached drawings.

DESCRIPTION OF THE PREFERRED EMBODIMENTS

Figure 1A:
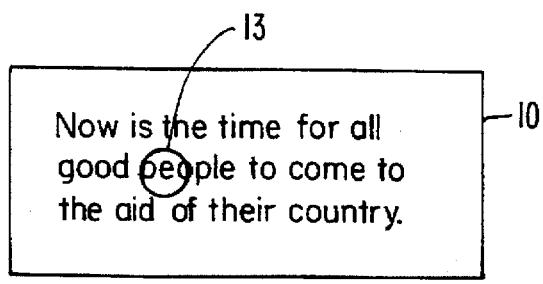
FIG. 1 is an illustration of how magnification, without more, obscures portions of an image.
Figure 1B:
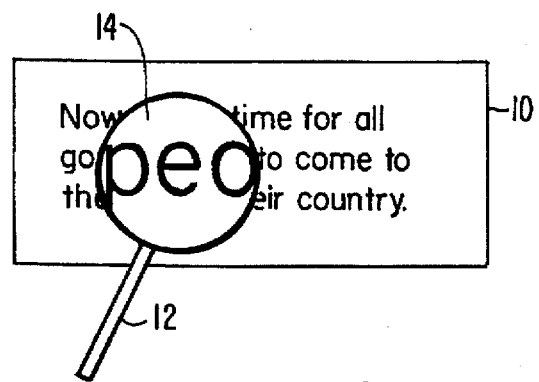
Figure 1C:
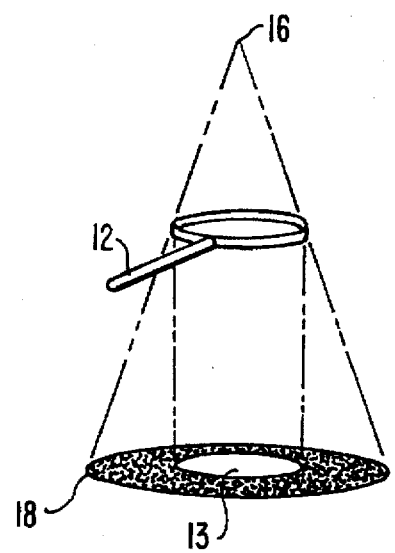
Figure 2:
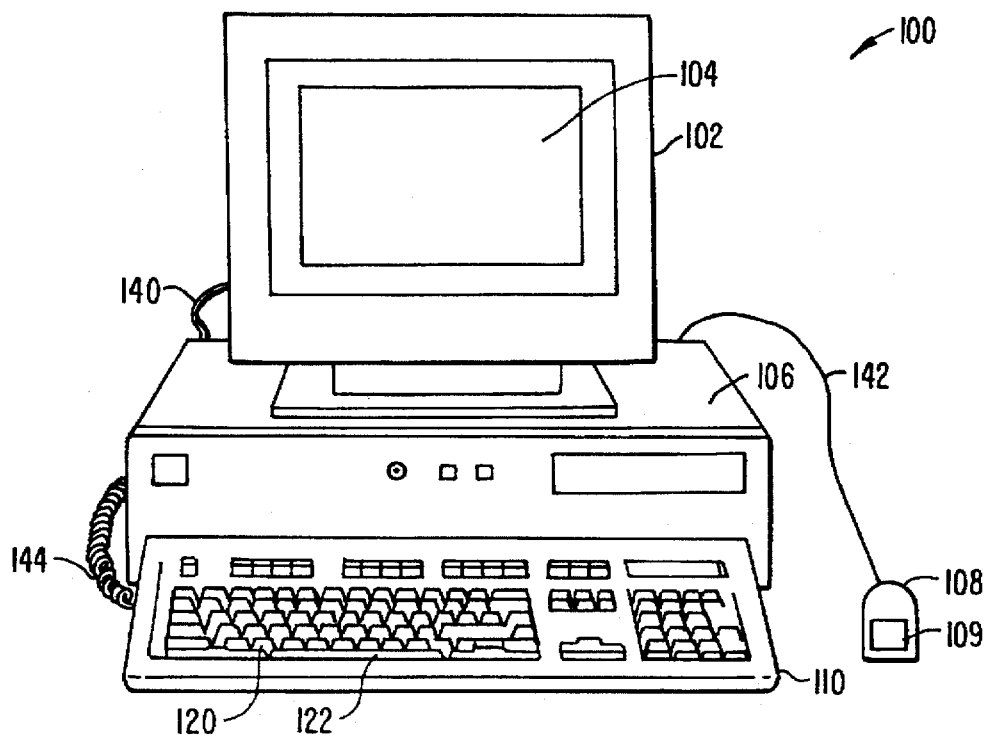
FIG. 2 is an illustration of an image display system including an image processor.

FIG. 2 is an illustration of a display system 100 according to the present invention which is used to display images using image lenses, and allows a user to manipulate parameters controlling the display of the images. Display system 100 comprises a display 102 which has a display surface 104, an image processor 106, a mouse 108 with an interface 142 to processor 106, and a keyboard 110 with an interface 144 to processor 106. An interface 140 between display 102 and processor 106 is also shown. In a particular embodiment, display 102 is a 1280×1024 color monitor manufactured by Silicon Graphics, and image processor 106 is a Silicon Graphics Iris workstation, model 4D/420 GTX. In alternate embodiments, mouse 108 and/or keyboard 110 are replaced by other input devices.

Figure 3:
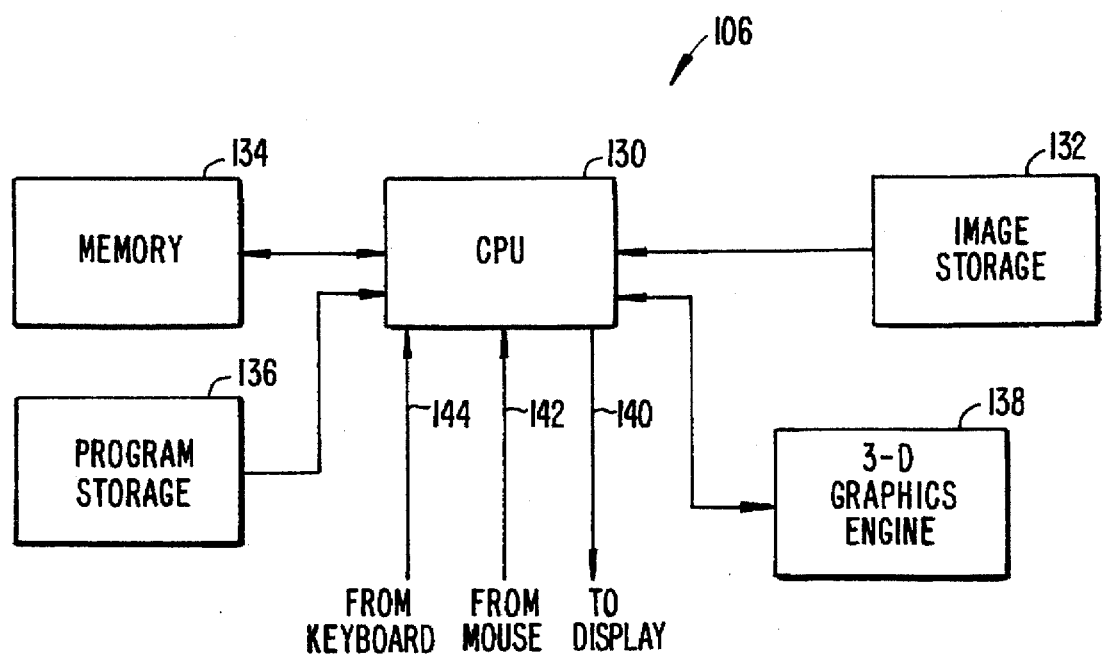
FIG. 3 is a block diagram of the image processor shown in FIG. 2.

FIG. 3 is a block diagram showing processor 106 in further detail. Processor 106 comprises a central processing unit (CPU) 130, image storage 132 which stores a logical representation of an image to be displayed (full image), a memory 134 for storage of variables and intermediate results of CPU 130, and a program storage 136 which contains CPU instructions which implement functions of display system 100. In some embodiments, processor 106 includes a 3D graphics engine 138. FIG. 3 also shows interface 140 (display output), interface 142 (mouse input), and interface 144 (keyboard input).

When display system 100 is operational, CPU 130 retrieves a full image from image storage 132. The retrieved image is either an image of objects mapped onto a 2D surface, such as pixels of various colors, or the retrieved image is a logical representation of an image to appear on the 2D surface, such as text characters in a document with an indication of the font and position in which the characters are to appear.

In either case, CPU 130, upon retrieving the image, performs the necessary processing such that the position, size and orientation of the objects in the image relative to a 2D original image surface are known. This representation of the image is the "full" image, which contains all the information content of the image, including context information. The full image can be represented in various forms, such as a bitmap at a specified resolution, or by an object representation such as a text file or listing of objects with positions and descriptions, as are well known in the art. If the full image is displayable on the display surface, then the image lens is not really needed. Nonetheless, there may be applications where an image lens is still needed when a full image is displayed with its full resolution, such as looking at close-ups of characters in a page-layout system.

After retrieving the image, processor 106 then transforms the image according to parameters specified by the user, from a 2D full image onto a 3D truncated pyramid, and then onto a viewing plane which represents display surface 104.

Figure 4A:
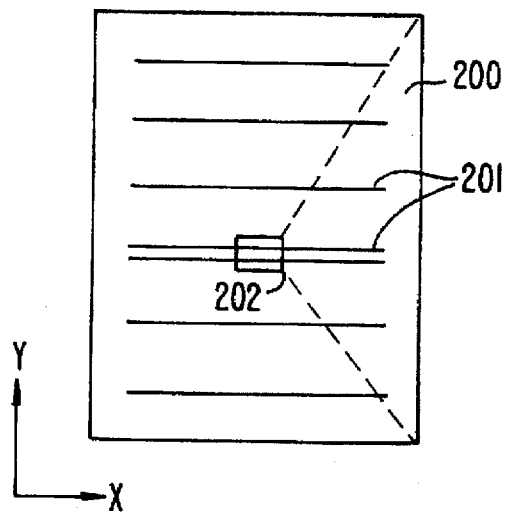
FIG. 4 is an illustration of the effects of an image lens on an image.

FIG. 4 illustrates, in general, the transformations performed on a full image. FIG. 4(a) is a 2D view of a full image 200 before being transformed. Image 200 is shown with lines 201 which are used to illustrate the effects of the transformations. By convention, the full image is mapped onto a constant z-plane in an (x, y, z) coordinate system. A smaller box, indicating a lensed panel 202 for which full detail is desired is also shown. This box is alternately referred to as the "image lens".

Figure 4B:
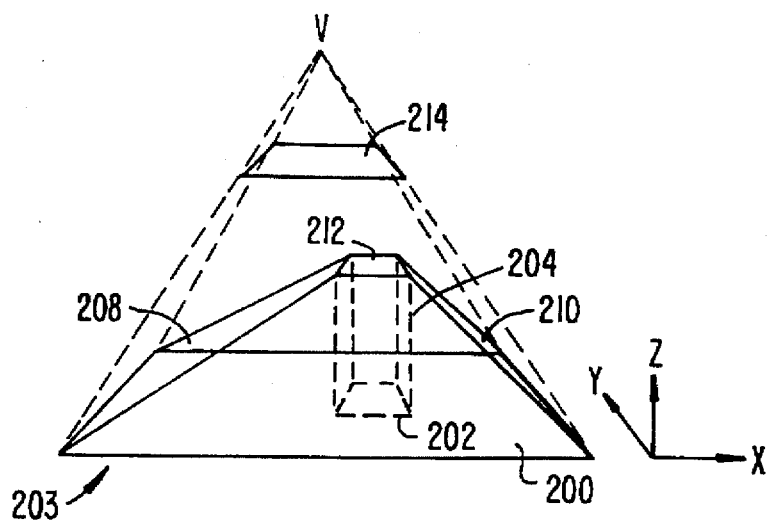

FIG. 4(b) is a 3D perspective view of a truncated pyramid 203 onto which full image 200 is mapped (lines 201 are left out for the sake of clarity). A viewing plane 214 relative to a viewpoint V is also shown. The five visible faces of truncated pyramid 203 are a bottom face 204, a top face 206, a left face 208, a right face 210, and a truncated lens face 212. For the 3D transformation, image 200 is divided into five "panels", or subimages, which are mapped onto the five visible faces of truncated pyramid 203. Viewing plane 214 defines what is visible from viewpoint V, and determines the eventual image to be displayed on display surface 104. To preserve context information, the movement of the image lens face 212 can be limited so that panel images are not unduly compressed.

Figure 4C:
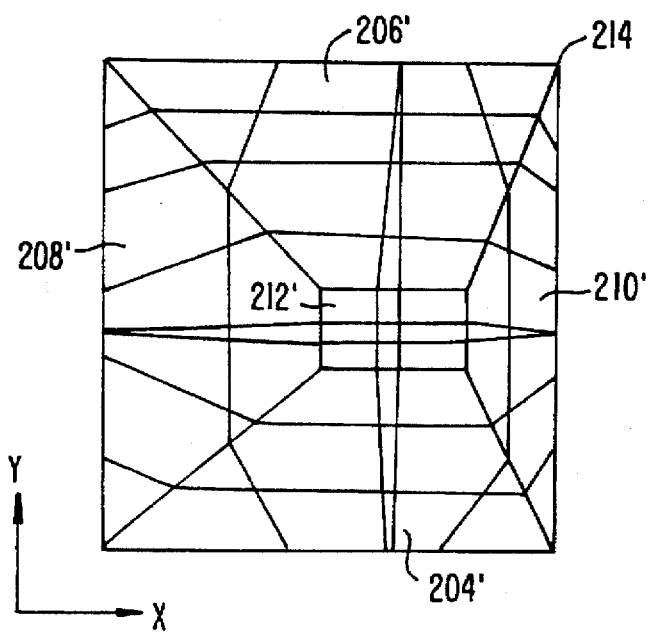

FIG. 4(c) is a 2D view of the transformed projection onto viewing plane 214. The projections 204', 206', 208', 210', 212' are projections of like numbered faces shown in FIG. 4(b). Significantly, lines in the image lens panel (face 212') and in the four side panel images (204', 206', 208', 210') remain as lines, and lines which connect in full image 200 remain connected across panel boundaries.

The parameters of the transformations are derived from a description of viewpoint V, the boundaries of full image 200 (which are also the edges of the base of truncated pyramid 203 in most cases), the boundaries of image lens 212 and the relative distances between full image 200 at the base of truncated pyramid 203, image lens 212, view plane 214, and viewpoint V. These parameters can be adjusted by a user to have the visual effects of moving the image lens in and out (zoom) and moving the image lens over full image 200 (pan). In some embodiments, the position of viewpoint V is modified by the user or is automatically modified so as to keep the projection of image lens 212 within the bounds of viewing plane 214. In FIG. 4(b), the projection of truncated pyramid 203 occupies all of viewing surface 214, so as to efficiently use display surface 104, however parameters might be provided so that view plane 214 and/or viewpoint V are movable such that this is not the case.

Figure 5A:
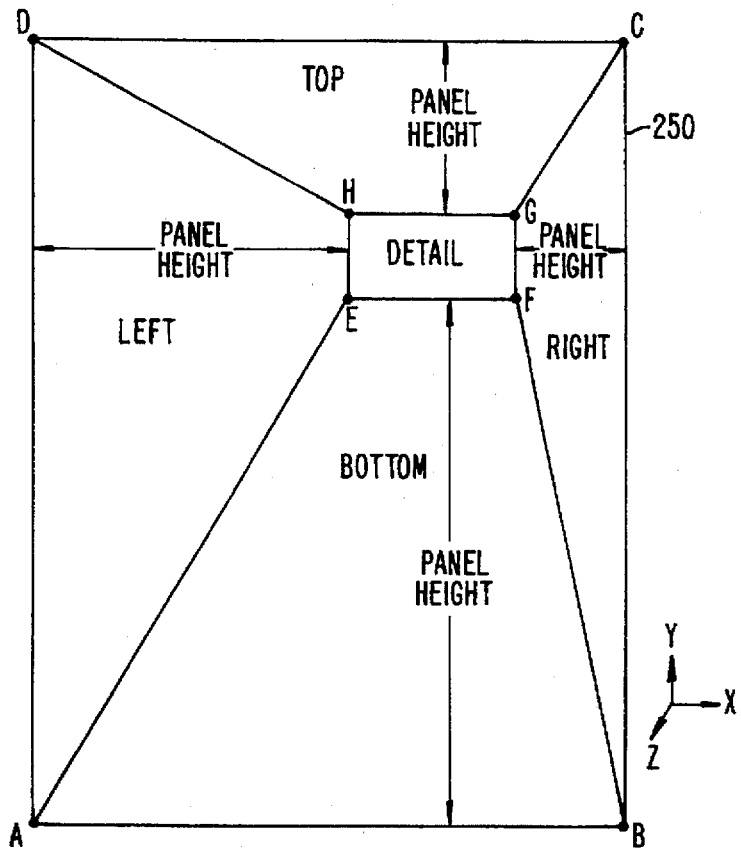
FIG. 5(a) is an illustration of the division of an image into panels.
Figure 5B:
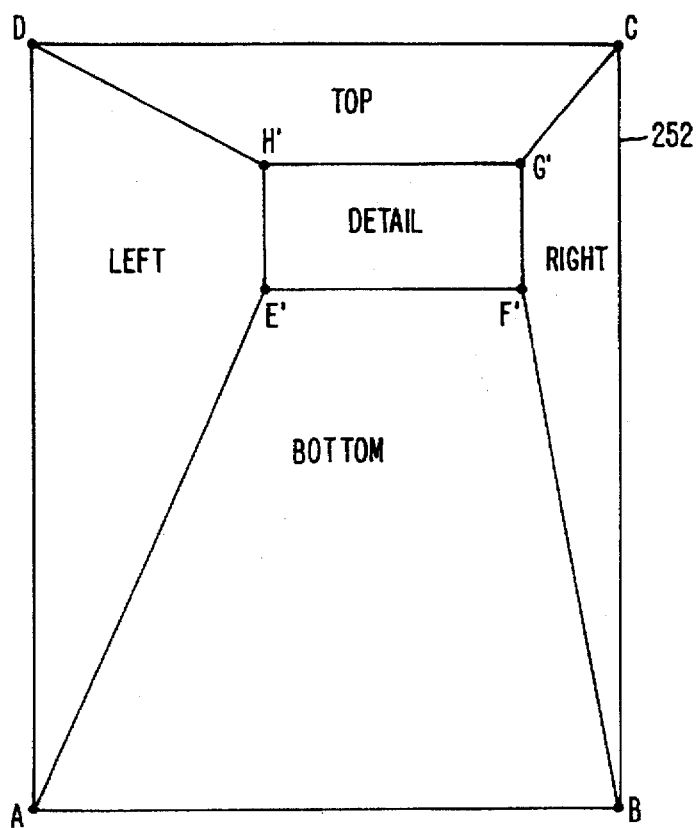
FIG. 5(b) is an illustration of the panels after being transformed.
Figure 6:
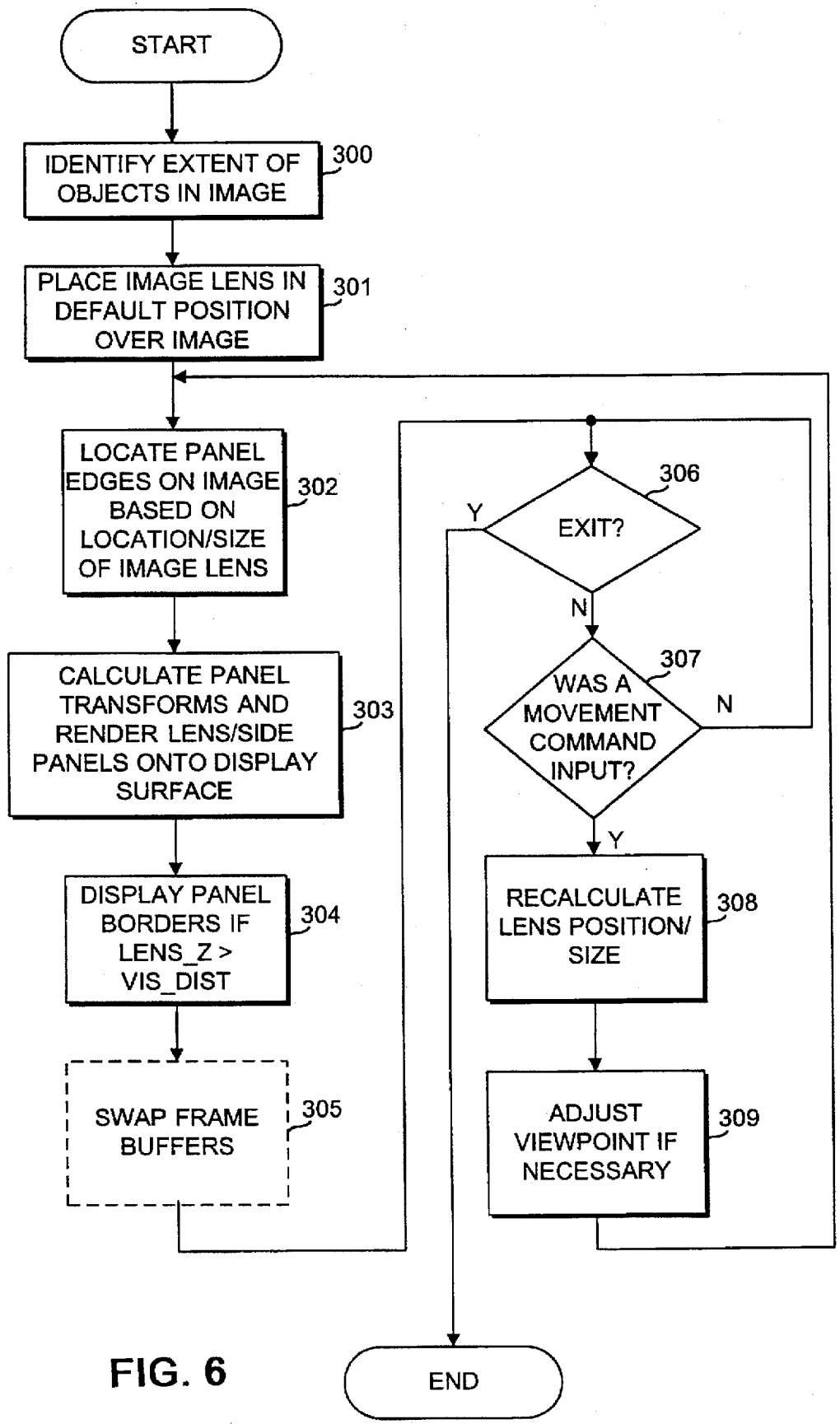
FIG. 6 is a flowchart describing a process of displaying an image using an image lens.

FIGS. 5(a)–(b) and the flowcharts of FIGS. 6–7 describe the operation of a specific embodiment of display system 100 according to the present invention. FIGS. 5(a)–(b) are mappings of an original full image 250 and a transformed, or "lensed", image 252. The flowcharts in FIGS. 6–7 describe the instructions which are stored in program storage 136 and are used by CPU 130 to effect the transformation of image 250 into image 252. In images 250 and 252, like points are similarly labelled. For example, point A is the same point in both images, and point E in image 250 is transformed to point E' in image 252. Image 250 is essentially a 2D image placed in a 3D space, while image 252 is a 3D image (although only a projection is displayable in FIG. 5(b) and on display surface 104). In the following description, the locations of the points of FIGS. 5(a)–(b) in the 3D space are shown in Table 1.

TABLE 1

Coordinates of Panel Vertices

A = (0, 0, 0)
B = (x_max, 0, 0)
C = (x_max, y_max, 0)
D = (o, y_max, 0)
E = (lens_x, lens_y, 0)
F = (lens_x + lens_width, lens_y, 0)
G = (lens_x + lens_width, lens_y + lens_height, 0)
H = (lens_x, lens_y + lens_height, 0)
E' = (lens_x, lens_y, lens_z)
F' = (lens_x + lens_width, lens_y, lens_z)
G' = (lens_x + lens_width, lens_y + lens_height, lens_z)
H' = (lens_x, lens_y + height, lens_z)

By convention, the x-axis extends to the right of the display, the y-axis extends up the display, and the z-axis extends out of the display towards the viewer. The variables used to described points in the 3D space can be fixed, but in a flexible system they would be stored in memory 134. In one system, x_max=144.0 display units and y_max=108.0 display units, thereby providing an aspect ratio of 4/3, which is the aspect ratio of most computer monitors. In that specific system, the viewpoint (eye_x, eye_y, eye_z) is initially (72.0, 54.0, 180.0), which is centered over the image, and the lens is centered on and flush with the image, with lens_center_x=lens_x+lens_width/2=72.0, lens_center_y=lens_y+lens_height/2=54.0, and lens_z=0. Starting values for lens_width and lens_height are 20.0 and 25.0 display units respectively.

Typically, the viewer of display 102 will manipulate mouse 108 with mouse button 109 pressed to modify the values of lens_x and lens_y, will manipulate mouse 108 with mouse button 109 pressed while the mouse is pointed at an edge of the lens panel to modify the values of lens_width and lens_height, and will use the Alt key 120 of keyboard 110 to increase lens_z and the space bar 122 of keyboard 110 to decrease lens_z. Of course, for more natural movement, more than one value of lens_x, lens_y, lens_z, lens_width and lens_height may be modified for a given mouse command.

To provide smooth movement when the lens is pulled in and out, a logarithmic approach function is used rather than moving the lens a fixed distance in the z direction for each press of a key on keyboard 110. With the logarithmic approach, one press of the space bar closes a percentage of the distance between the image lens and the plane z=0, while one press of the Alt key closes a percentage of the distance between the image lens and a z slightly less than eye_z. The image lens is limited to a maximum z of slightly less than the viewpoint to avoid total loss of context information if the image lens were to move too close to the z=eye_z plane. The percentage of the distance closed is settable by the user, or it can be fixed at 10%.

Figure 7A:
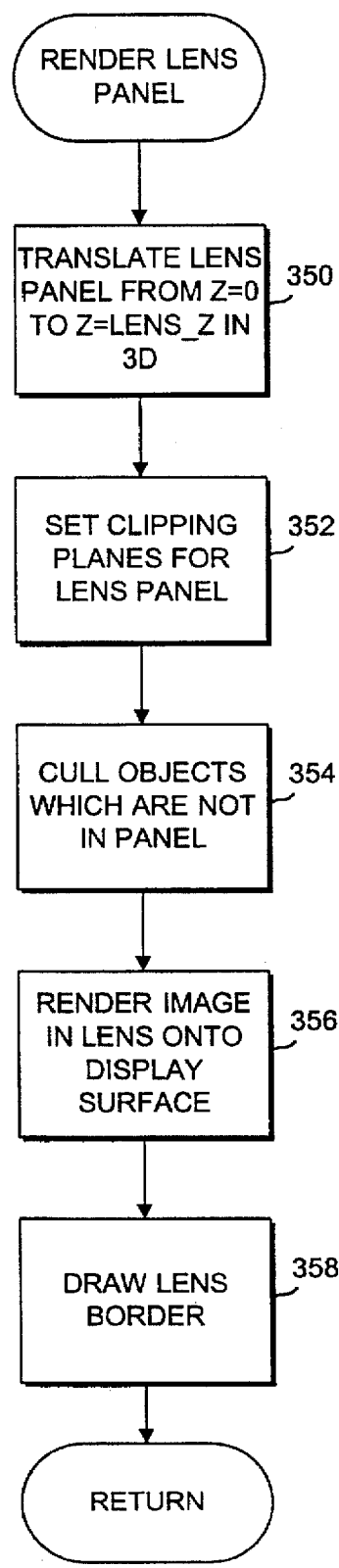
FIG. 7(a) is a flowchart describing a process of rendering a lens panel.
Figure 7B:
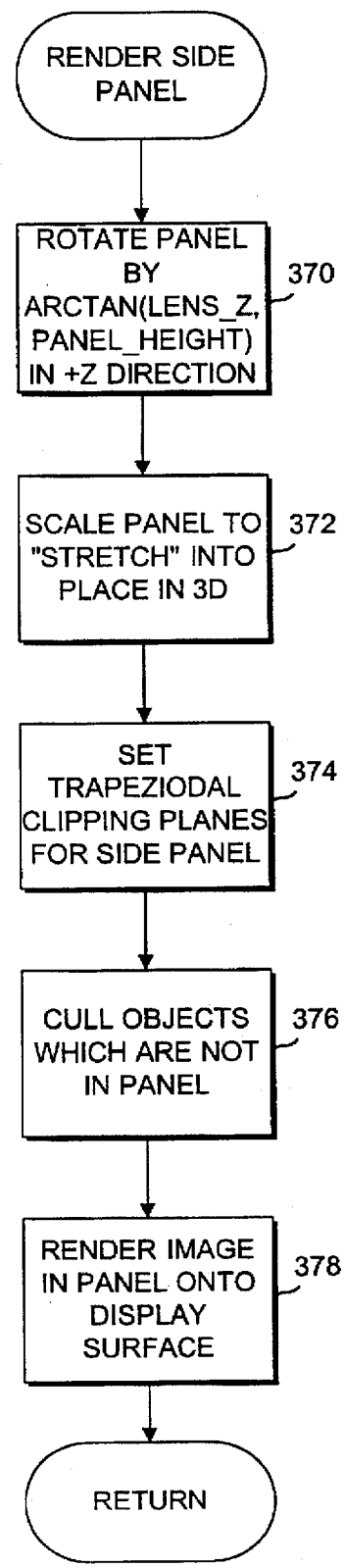
FIG. 7(b) is a flowchart describing a process of rendering a side panel.

FIG. 6 is a flowchart describing the high-level functions embodied in the CPU instructions stored in program storage 136. These functions are performed by CPU 130 to convert a full image into a focus+context representation. FIG. 7(a) –(b) are more detailed flowcharts of the rendering steps shown in FIG. 6. Unless otherwise indicated, the flow of the program is in block number order.

At block 300, CPU 130 identifies where the objects of the full image appear. If the image is that of a multi-page document, then this step might include parsing the document into lines and pages, determining how many pages are needed, and placing the pages in a two-dimensional page array. In the 3D space, the image begins flat on the z=0 plane, bounded by the points (x,y,z)=(0,0,0), (x,y,z)=(x_max, 0, 0), (x,y,z)=(x_max, y_max, 0) and (x,y,z)=(0, y_max, 0). The actual image is not necessarily rendered at this point, but this step is useful in a document for identifying how many pages will be needed, which is useful to know in a later culling process.

At block 301, the image lens is placed relative to the image in its default position. At block 302, the boundaries of the five panels are determined. As FIG. 5(a) shows, the boundaries are determinable from x_max, y_max, lens_x, lens_y, lens_width and lens_height or from the expressions for points A, B, C, D, E, F, G and H (see Table 1).

At block 303, CPU 130 calculates the transforms of each of the panels and renders the transformed image onto the display. Because the display is a 2D perspective of a 3D truncated pyramid onto which the image is placed, the lens panel will show a portion of the full image in detail, and the side panels will show the remainder of the image in varying degrees of detail, with more detail closer to the lens panel, and the side panels will also show global context.

To perform transformation and rendering efficiently, every point of the image is not transformed, but instead only the vertices and an identity matrix are transformed. CPU 130 uses the locations of the transformed vertices to determine the extent of a panel on the display surface, and uses the transformed matrix to place points of the full image onto the display surface. In some embodiments, the transformations and rendering are performed in whole or part by the specialized 3D graphics engine 138, which is usually implemented with a dedicated integrated circuit. One example of a 3D graphics engine is the Silicon Graphics Iris 4D/420 VGX.

Because the image is transformed onto a 3D truncated pyramid which is then transformed through a perspective transform where the lens panel is the top of the truncated pyramid, the lens panel appears larger to the viewer, and if lens_z is sufficiently large relative to eye_z, the resolution of the display and the image, the details of the image portion in the lens panel are discernable.

At block 304, CPU 130 adds side panel borders from the vertices of the lens to the edges of the image. If the lens is close to the z=0 plane (i.e., lens_z<vis_dist, for some threshold value vis_dist, indicating a small "magnification" effect), the borders between side panels are not shown. In some embodiments, one frame buffer holds what the viewer currently sees, and another frame buffer is used to hold the display generated by the above process. Once the second frame buffer is completed, the two frame buffers are swapped at block 305 before CPU 130 returns to block 302.

At block 306, CPU 130 exits the program if some predetermined exit condition is met, otherwise it proceeds to block 307. At block 307, CPU 130 checks for a lens movement command, and in embodiments where it is allowed, checks for a viewpoint movement command. If a movement command has not been entered, CPU 130 moves back to block 306, otherwise it proceeds to block 308.

At block 308, CPU 130 recalculates the lens position and size. As explained above, the position adjustments modify the values of lens_x, lens_y, and lens_z, while size adjustments modify the values of lens_width and lens_height.

At block 309, the viewpoint is adjusted if necessary. As can be seen from FIG. 4(b), if lens panel 212 is positioned high enough and far enough to one side, it will move outside the pyramid defined by viewpoint V and the base image 200, in which case the lens panel will not be visible. To avoid this situation, in some embodiments, the viewpoint moves with the lens. CPU 130 generates this effect by coupling the values of eye_x and eye_y to lens_center_x and lens_center_y, so that the lens panel tends to remain visible. The position of the viewpoint affects what the user sees since, as explained above, the viewpoint is used in the calculation of the perspective transform.

In a specific embodiment, the viewpoint is moved differently depending on where the lens panel is and how it is moved. For an X-Y movement, the tracking depends on the value of lens_z relative to eye_z. If lens_z is close to zero, the lens panel is close to the z=0 plane. Tracking is not really necessary in this case because, as FIG. 4(b) shows, the lens panel is much less likely to be moved outside the view of view plane 214, so viewpoint tracking is not done for lens_z below some threshold value. On the other hand, if the lens panel is close to the viewpoint (lens_z near eye_z), the viewpoint tracks the lens panel to keep the lens panel in view. This can be done by moving eye_x and eye_y according to the following: eye_x=eye_x+(x_diff * (lens_z / eye_z)) and eye_y=eye_y+(y_diff , (lens_z / eye_z)), where x_diff and y_diff are the change in the x-y coordinates of the lens.

When the lens panel is moved in the z direction, the viewpoint is moved to give the appearance that the lens is staying in one place, only growing or shrinking in size. This is done by adjusting eye_x and eye_y according to the following: eye_x=eye_x−(x_distance , lens_adj_factor) and eye_y=eye_y−(y_distance , lens_adj_factor), where lens_adj_factor is the percentage change in the value of eye_z. When the lens is moving away from the viewpoint in the z direction, x_distance=(eye_x−eye_$x_0$) and y_distance=(eye_y−eye_$y_0$), where (eye_$x_0$, eye_$y_0$) are the initial x-y coordinates of the viewpoint centered over the image. The result is that the lens appears to stay in approximately the same position on the screen, only growing smaller. When the lens is moving toward the viewpoint, x_distance=(eye_x −lens_center_x) and y_distance= (eye_y−lens_center_y). The result is this case is that the lens appears to stay in approximately the same position on the screen, only growing larger.

Once the lens and viewpoint positions have been adjusted, CPU 130 returns to block 302 and repeats the process.

The 3D transform for the lens panel is a translation of the panel from z=0 to z=lens_z, followed by the 3D perspective transform. FIG. 7(a) is a flowchart of a program executed by CPU 130 to render the lens panel onto display surface 104, as might be called in block 303 of FIG. 6.

First, at block 350, the lens panel is translated to z=lens_z. Next, at block 352, clipping planes are set for the lens panel. Four clipping planes are used for a rectangular lens to indicate which portion of the full image is within the lens and which portions are not. These clipping planes are used for two purposes. In the next block, block 354, objects which are not part of the image portion within the lens panel are culled from consideration during rendering, so that they do not need to be processed. Objects which are partially in a panel, such as a page 400 shown in FIG. 8 which is only partially in a lens panel 402, is not culled, but part of the rendered image of that page is clipped by the clipping planes. Clipping planes are not required for clipping. but are typically used where the display system has hardware that supports clipping planes, which makes them fast and make their coding simple.

At block 356, the detail image within the lens panel is rendered. The image is rendered as is known in the art from the full image, the bounds of the lens panel on the full image, the bounds of the lens on the display surface, the pixel resolution of the display surface and the transformation matrix between points on the full image and points on the display surface.

Once rendered, the lens panel is displayed (or stored to a frame buffer until the rest of the display is rendered). Next, at block 358, the lens border is added to the displayed image. The lens border could be either a solid line or a shaded line.

The 3D transform for a side panel of the image is a rotation about the side panel edge which forms an edge of the full image, followed by a scaling of the side panel towards the lens panel, so that the side panel meets the lens panel. After the 3D transform, the 3D perspective transform is done, however all these transforms might be done by a mere matrix multiplication.

FIG. 7(b) is a flowchart of a program executed by CPU 130 to render a side panel onto a display surface. At block 370, the side panel is rotated by $\tan^{-1}$( len_z / panel_height) around the image edge which forms one edge of the side panel, where panel_height is the distance between the axis of rotation and the opposite edge of the side panel, the edge which meets with the edge of the lens panel in the full image.

Next, at block 372, CPU 130 expands the side panel so that it will again "meet" the edge of the lens panel, which has been moved up in the 3D space. The side panel is expanded by a factor of $(\text{panel\_height}^2 + \text{lens\_z}^2)^{1/2}/\text{panel\_height}$. The values of panel_height for the bottom, top. left and right side panels shown in FIG. 5(a) are lens_y, y_max−lens_y lens_height, lens_x and x_max−lens_x−lens_width, respectively.

After rotation and expansion, the side panels "meet" the lens panel in the 3D space, so the 3D perspective transform of the side panels, when added to the transform of the lens panel show the entire image, although with varying levels of detail. Since the entire image is shown, context is preserved.

At block 374, clipping planes are set for the side panel. Four clipping planes are also used here, but they form a trapezoid instead of a rectangle as was the case with the clipping planes for the lens panel. At block 376, objects entirely outside the clipping planes are culled.

At block 378, the image within the side panel being processed is rendered, using the transformation matrix for the combination of the two 3D transforms and the 3D perspective transform, the side panel is then displayed or stored to a frame buffer until the rest of the display is rendered.

Figure 8:
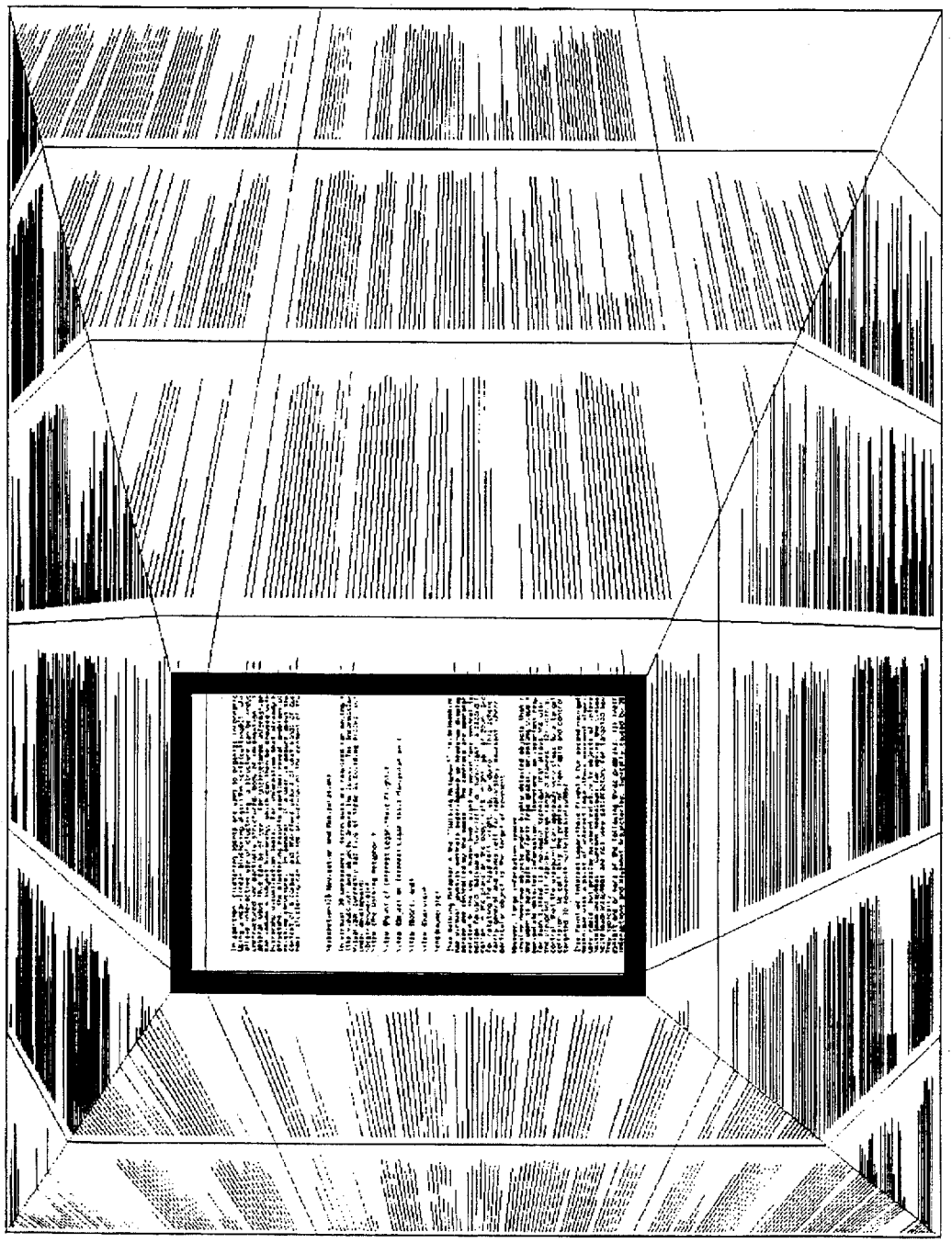
FIG. 8 is a displayed image of a multi-page document as seen through an image lens with text in the side panels greeked.

FIG. 8 shows an display surface resulting from the application of a document lens to an image comprising multiple pages of text. As shown in FIG. 8, where the image is text, the text within the lens panel is rendered in the font for that text, but the text within the side panels may be rendered in a greeked font. In a greeked font, a line of text is rendered as a single line. Greeking is used where speed is important, such as where the lens is moving and many image frames must be generated quickly to provide the appearance of motion. In one embodiment, the text of the side panels is always greeked, while in another embodiment, the text in the side panels is greeked only when the lens is in motion. FIG. 8 illustrates how global context is preserved using a display system according to the present invention. With a multi-color display, or other means for contrasting text, the image displayed might include text of a different color to show occurrences of a search term. The global results of the search could be shown even where the side panels are greeked, with the greeked lines maintaining the color of the underlying text. In this way, the occurrences of search terms would still be shown for the entire image, even if the side panels were greeked.

Figure 9:
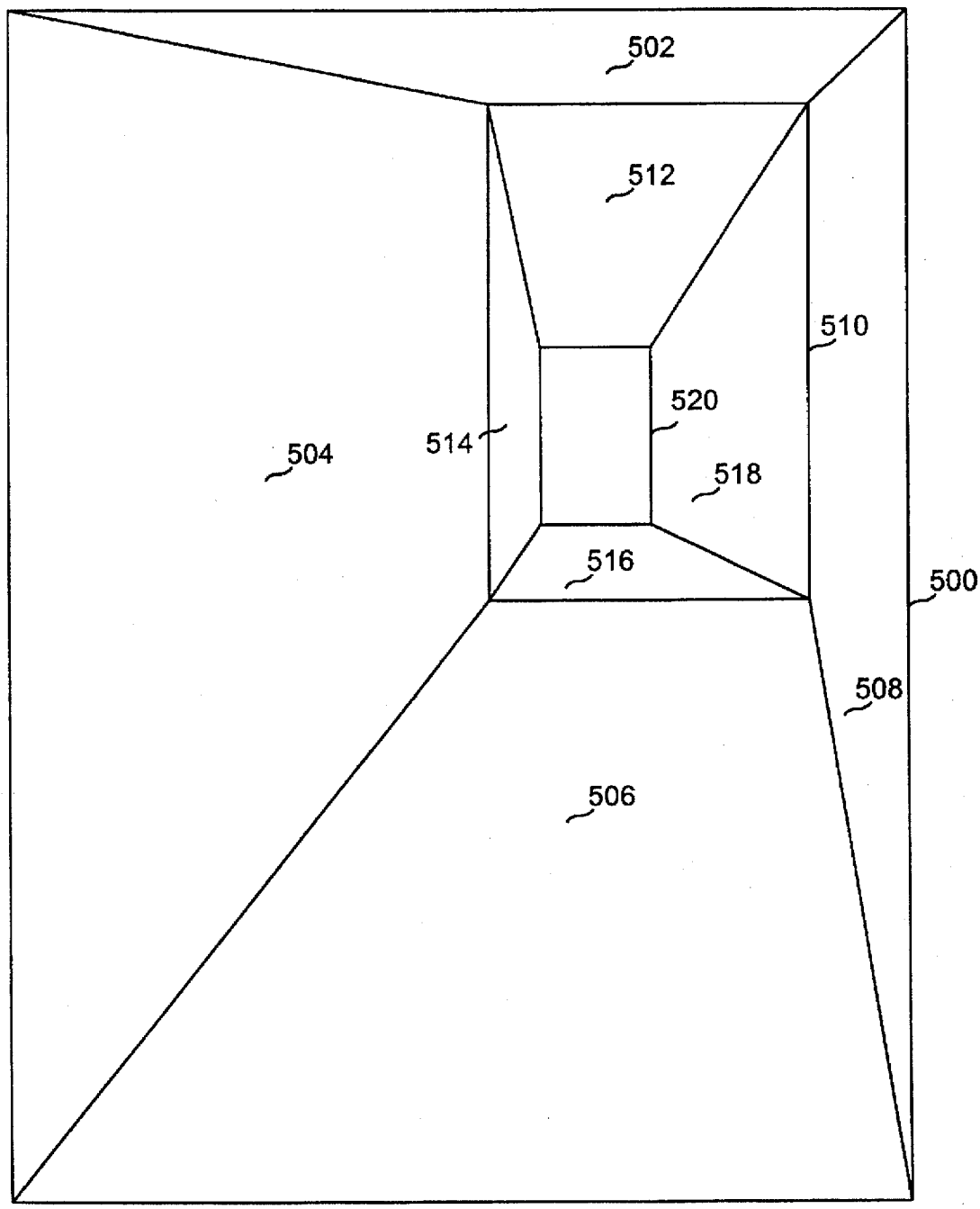
FIG. 9 is a line diagram of a specific embodiment of the present invention wherein an nested image lens is used on the image provided in the image lens panel of a nesting image lens.

FIG. 9 is a line diagram of a nested image lens. To produce the image in FIG. 9, first the image bounded by a border 500 is transformed using an image lens as described above, resulting in side panels 502, 504, 506, 508, and a lens panel 510. Lens panel 510 is then transformed as if it were an image itself, resulting in side panels 512, 514, 516, 518, and nested image lens 520. Using a prearranged set of input commands, the viewer manipulates the movement of lens panel 510 and lens panel 520. One possibility is for a key on the keyboard to be designated the lens pointer key which, when pressed, alters the "current" lens panel to which lens movement and sizing commands are applied. A key could be provided to turn off nested image lens 520, or the viewer could simply manipulate it to be on the surface of nesting image lens 510 for the same effect.

The image in FIG. 9 would be displayed on nine panels. However, it should be apparent that the nesting is not limited to two levels, but could be as many as is useful for the particular image. Additionally, it should also be apparent that the nested image lens need not only modify the nesting image lens, but the nested image lens could modify a side panel of the nesting image. It should also be apparent that the viewpoint tracking could be modified such that the viewpoint tracks lens panel 510 to keep it in view and tracks lens panel 520 in view relative to image 500 or relative to the image on lens panel 510. The former would be an extension of the viewpoint tracking described above with lens panel 510 used as a base, whereas the latter would use lens panel 500 as a base.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

```
;;; -*- Mode: Lisp; Package: iv; Base: 10.; Syntax: Common-Lisp -*-
;;;
;;; Copyr. (c) 1989-93 by Xerox Corporation.  All rights reserved.
;;;

;; Lens - Room used for displaying text with special magnifying lens (declaim (optimize (speed 3) (space 0) (safety 1) (debug 2)))

;; George G. Robertson - Xerox PARC (in-package :iv)

;;===============================================================

(defvar *L-Room* nil)    ;; Lens Room (eval-when (compile load eval)
   (proclaim '(single-float *l-xmax* *l-ymax* *l-zmax*)))
(defconstant *l-xmax* 144.0)
(defconstant *l-ymax* 108.0)
(defconstant *l-zmax* 360.0)

(defvar +lens-wall-light+
   (make-color :red 140 :green 140 :blue 230 :alpha 0))
(defvar +lens-wall-dark+
   (make-color :red 70 :green 70 :blue 190 :alpha 0))

(eval-when (compile load eval)
   (proclaim '(fixnum *Lens-Search-Count*)))

(defvar *Lens-Filename* "")
(defvar *Lens-Greek* t)
(defvar *Lens-Search-String* "")
(defvar *Lens-Search-Count* 0)

(defmacro do-greek ()
  `(or *IV-In-Overview*
       *AL-Animation-In-Progress*
       (buttonp dev-LeftMouse)
       (buttonp dev-MiddleMouse)
       (buttonp dev-space)
       (buttonp dev-leftalt)
       ))

(defun Toggle-Greek ()
  (setq *Lens-Greek* (not *Lens-Greek*)))

;;===============================================================
;; Lens (defvar *lens* nil)   ;; set by draw-io on 3d-lens-io (defclass 3D-Lens-IO (3d-interactive-object)
  ((Left-Plane :accessor io-left-plane :initarg :left-plane)
```

21
      (Right-Plane :accessor io-right-plane :initarg :right-plane)
      (Top-Plane :accessor io-top-plane :initarg :top-plane)
      (Bottom-Plane :accessor io-bottom-plane :initarg :bottom-plane))
 5    (:default-initargs
      :Left-Plane   (make-plane :A 1.0 :B 0.0 :C 1.0)
      :Right-Plane  (make-plane :A -1.0 :B 0.0 :C -1.0)
      :Top-Plane    (make-plane :A 0.0 :B -1.0 :C -1.0)
      :Bottom-Plane (make-plane :A 0.0 :B 1.0 :C 1.0))
10
      (:metaclass clos::opt-class)
      )

(defun Update-Lens-Plane-Equations (lens)
15    (let* ((position (io-position lens))
           (size (io-size lens))
           (width (size-width size))
           (height (size-height size))
           (left (point-x position))
20         (right (f+ left width))
           (bottom (point-y position))
           (top (f+ bottom height)))
        (declare (single-float left right top bottom))
        (setf (plane-d (io-left-plane lens)) (f- 0.0 left))
25      (setf (plane-d (io-right-plane lens)) right)
        (setf (plane-d (io-bottom-plane lens)) (f- 0.0 bottom))
        (setf (plane-d (io-top-plane lens)) top)
        )
      t)
30
   (defun Make-3D-Lens-IO (title &rest keyword-pairs &key
                                 &allow-other-keys)
      (declare (dynamic-extent keyword-pairs))
      (let ((lens (apply #'make-instance '3d-lens-io
35                       :title title
                         :display-title-p nil
                         :Tracks-grasp :Plane
                         :allow-other-keys t
                         keyword-pairs)))
40      (Update-Lens-Plane-Equations lens)
        lens))

(eval-when (compile load eval)
      (proclaim '(single-float *lens-adjustment-factor*)))
45 (defvar *lens-adjustment-factor* 0.10)

(defmethod enter-io :before ((item 3d-lens-io))
      (setf (aref (the (simple-array single-float (*)) znear-far) 1)
            5000.0)
50    (when *ms-top-menu*
        (Add-To-Menu *ms-top-menu* "Greek"
                     :select-function #'Toggle-Greek))
      (set-font +Vector-Font+)
      t)
55
   (defmethod draw-io ((item 3d-lens-io) picking)
      ;;; draw-whiteboard normally does grasp tracking.
```

22
```
;;; We want to do a special kind of grasp tracking, where
;;; the object is moved AND the viewpoint is moved.
;;; Here we want to allow the user to use the space and alt keys
;;; to move the object and viewpoint together.
;;; Space moves the object away from you (only changing z)
;;; and moves the viewpoint towards the home position (x,y).
;;; Alt moves the object toward you (only changing z)
;;; and moves the viewpoint toward the x,y of the object.

;; No idle if either space or alt is down
(when (or (buttonp dev-space) (buttonp dev-leftalt))
    (Inhibit-Idle))

(let ((adjust-perspective nil)
      (changed nil)
      (position (io-position item))
      (couple-navigation (not (buttonp dev-f1)))
      (home (io-home item))
      (eye-home (room-eye-home *room*)))
  (setq *lens* item)

;; Move object in plane
  (when (and (buttonp dev-LeftMouse)
             (eq *Current-Interactive-Object* item))
    (let* ((old-x (point-x position))
           (old-y (point-y position))
           (x-diff 0.0) (y-diff 0.0)
           (tracking-ratio 0.0))
      (declare (single-float old-x old-y x-diff y-diff
 tracking-ratio))
      (setq *AL-Left-Mouse-Grasp* t)
      (when (3D-Gesture-Parsing-Mouse-Tracker item)
        (setq x-diff (f- (point-x position) old-x)
              y-diff (f- (point-y position) old-y))
        ;; When item is close to front wall (z near 0), don't track;
        ;; When item is close to eye (z near eyez), track;
        ;; when in between, do it proportionally
        (setq tracking-ratio (f/ (point-z position) (point-z eye)))
        (when couple-navigation
          (setf (point-x eye)
                (f+ (point-x eye) (f* x-diff tracking-ratio)))
          (setf (point-y eye)
                (f+ (point-y eye) (f* y-diff tracking-ratio))))
        (setq changed t
              adjust-perspective t))
      (setq *AL-Left-Mouse-Grasp* nil)
      ))

;; Move object away from you (only in z)
  (when (and (or (null *Current-Interactive-Object*)
                 (eq *Current-Interactive-Object* item))
             (buttonp dev-space))
    (let ((zdistance (point-z position)))
      (declare (single-float zdistance))
      (setf (point-z position)
            (f- (point-z position) (f* zdistance
                                       *lens-adjustment-factor*))))
```

```
                                23
  ;; Move viewpoint towards home (only in x,y)
  (when couple-navigation
    (let ((xdistance (f- (point-x eye) (point-x eye-home)))
          (ydistance (f- (point-y eye) (point-y eye-home))))
      (declare (single-float xdistance ydistance))
      (setf (point-x eye)
            (f- (point-x eye) (f* xdistance
                                  *lens-adjustment-factor*)))
      (setf (point-y eye)
            (f- (point-y eye) (f* ydistance
                                  *lens-adjustment-factor*))))
    (setq changed t
          adjust-perspective t))

;; Move object toward you (only in z)
  (when (and (or (null *Current-Interactive-Object*)
                 (eq *Current-Interactive-Object* item))
             (buttonp dev-leftalt))
    (let ((zdistance (f- (f- (point-z eye) 3.0)
                         (point-z position))))
      (declare (single-float zdistance))
      (setf (point-z position)
            (f+ (point-z position) (f* zdistance
                                       *lens-adjustment-factor*)))))

;; Move viewpoint towards center of object (only in x,y)
  (when couple-navigation
    (let* ((size (io-size item))
           (width (size-width size))
           (height (size-height size))
           (xcenter (f+ (point-x position) (f/ width 2.0)))
           (ycenter (f+ (point-y position) (f/ height 2.0)))
           (xdistance (f- (point-x eye) xcenter))
           (ydistance (f- (point-y eye) ycenter)))
      (declare (single-float xdistance ydistance xcenter ycenter
                             width height))
      (setf (point-x eye)
            (f- (point-x eye) (f* xdistance
                                  *lens-adjustment-factor*)))
      (setf (point-y eye)
            (f- (point-y eye) (f* ydistance
                                  *lens-adjustment-factor*))))
    (setq changed t
          adjust-perspective t))

(when changed
    (setf (point-x home) (point-x position))
    (setf (point-y home) (point-y position))
    (setf (point-z home) (point-z position))

(Update-Lens-Plane-Equations item)

;; Update side-wall positions, angles, and plane equations
    (Update-Lens-Walls))

(when adjust-perspective
    (set-perspective))
```

```
                                   24
      (ig:pushmatrix)
      (ig:translate 0.0 0.0 0.2)
      (draw-whiteboard item picking t t nil nil
        ;;;
 5      (when (not picking)
          (ig:pushmatrix)
          (ig:translate (f- 0.0 (point-x position))
                        (f- 0.0 (point-y position))
10                      0.0)

(ig:clipplane 0 ig::cp_define (io-left-plane item))
          (ig:clipplane 1 ig::cp_define (io-bottom-plane item))
          (ig:clipplane 2 ig::cp_define (io-right-plane item))
          (ig:clipplane 3 ig::cp_define (io-top-plane item))
15        (ig:clipplane 0 ig::cp_on nil)
          (ig:clipplane 1 ig::cp_on nil)
          (ig:clipplane 2 ig::cp_on nil)
          (ig:clipplane 3 ig::cp_on nil)

20        (draw-lens-text :lens)

(ig:clipplane 0 ig::cp_off nil)
          (ig:clipplane 1 ig::cp_off nil)
          (ig:clipplane 2 ig::cp_off nil)
25        (ig:clipplane 3 ig::cp_off nil)

(ig:popmatrix))
        nil)

30    ;; Draw lines for edges of walls
      (let* ((position (io-position item))
             (z (point-z position)))
        (declare (single-float z))
        (when (> z 1.0)
35        (let* ((left (point-x position))
               (bottom (point-y position))
               (size (io-size item))
               (width (size-width size))
               (height (size-height size))
40             (right (f+ left width))
               (top (f+ bottom height)))
          (declare (single-float left right top bottom width height))
          (setq z (f+ z 0.20))
          (ig:rgbcolor 5 5 5)
45        (ig:bgnline)
          (ig:v3f-coord 0.0 0.0 0.20)
          (ig:v3f-coord left bottom z)
          (ig:endline)
          (ig:bgnline)
50        (ig:v3f-coord 0.0 *l-ymax* 0.20)
          (ig:v3f-coord left top z)
          (ig:endline)
          (ig:bgnline)
          (ig:v3f-coord *l-xmax* *l-ymax* 0.20)
55        (ig:v3f-coord right top z)
          (ig:endline)
          (ig:bgnline)
```

```
                    (ig:v3f-coord *l-xmax* 0.0 0.20)
                    (ig:v3f-coord right bottom z)
                    (ig:endline)
                    )))
        (ig:popmatrix)
      nil))

(defmethod move-io ((lens 3d-lens-io))
      (let ((orientation (io-orientation lens)))
        ;; make sure the lens orientation does not change
        (setf (orientation-x orientation) 0)
        (setf (orientation-y orientation) 0)
        (setf (orientation-z orientation) 0))
      t)

;;===========================================================
;; Lens Wall (defclass 3D-Lens-Wall-IO (3d-interactive-object)
  ((Which       :accessor io-which       :initarg :which)
   (Stretch     :accessor io-stretch     :initarg :stretch)
   (Left-Plane  :accessor io-left-plane  :initarg :left-plane)
   (Right-Plane :accessor io-right-plane :initarg :right-plane)
   (Top-Plane   :accessor io-top-plane   :initarg :top-plane)
   (Bottom-Plane :accessor io-bottom-plane :initarg :bottom-plane))

(:default-initargs
   :which :left
   :pickable nil
   :stretch (make-float-box 1.0)
   :Left-Plane   (make-plane)
   :Right-Plane  (make-plane)
   :Top-Plane    (make-plane)
   :Bottom-Plane (make-plane))

(:metaclass clos::opt-class)
  )

;; Plane equation update:  Ax + By + Cz + D = 0
;; The lens walls' clipping planes are all perpendicular to x-y plane;
;; hence C=0 for all of these plane equations.
;; The trapezoid side plane equations all look like:
;;   A = y2 - y1
;;   B = x2 - x1
;;   D = -[(y2-y1)x1 + (x2-x1)y1]

(defun Update-Lens-Walls ()
  (let ((lens (find-Interactive-Object "Lens"))
        (left-wall (find-Interactive-Object "Lens Left Wall"))
        (right-wall (find-Interactive-Object "Lens Right Wall"))
        (top-wall (find-Interactive-Object "Lens Top Wall"))
        (bottom-wall (find-Interactive-Object "Lens Bottom Wall")))
    (when lens
      (let* ( wall size position
              (width 0.0)
              (height 0.0)
              (lens-position (io-position lens))
```

```
              (lens-size (io-size lens))
              (lens-width (size-width lens-size))
              (lens-height (size-height lens-size))
              (lens-z (point-z lens-position))
   5          (lens-left (point-x lens-position))
              (lens-bottom (point-y lens-position))
              (lens-right 0.0)
              (lens-top 0.0)
              (aa 0.0) (bb 0.0))
  10      (declare (single-float aa bb width height lens-width
                    lens-height lens-left lens-right lens-bottom lens-top))

(setq lens-right (f+ lens-left lens-width))
          (setq lens-top (f+ lens-bottom lens-height))
  15
          ;;---------- Left Wall ----------
          (setq wall left-wall)
          (setq position (io-position wall)
                size (io-size wall))
  20
          ;; set position and size
          (setf (size-width size) lens-left)

;; set angle
  25      (setf (orientation-y (io-orientation wall))
                (the fixnum
                  (trunc (f* 1800.0
                             (f/ (f- 0.0 (my-atan lens-z lens-left))
                                 my-pi)))))
  30
          ;; set stretch factor
          (setf (float-value (io-stretch wall))
            (f/ (my-sqrt (f+ (f* lens-left lens-left)
                             (f* lens-z lens-z)))
  35            lens-left))

;; set plane equations
          (setf (plane-a (io-right-plane wall)) -1.0)
          (setf (plane-d (io-right-plane wall)) lens-left)
  40
          (setf (plane-a (io-bottom-plane wall)) (f- 0.0 lens-bottom))
          (setf (plane-b (io-bottom-plane wall)) lens-left)

(setf (plane-a (io-top-plane wall)) (f- lens-top *l-ymax*))
  45      (setf (plane-b (io-top-plane wall)) (f- 0.0 lens-left))
          (setf (plane-d (io-top-plane wall)) (f* lens-left *l-ymax*))

;;---------- Right Wall ----------
  50      (setq wall right-wall)
          (setq position (io-position wall)
                size (io-size wall))

;; set position and size
  55      (setf (point-x position) lens-right)
          (setf (point-z position) lens-z)
          (setq width (f- *l-xmax* lens-right))
```

```
                              27
            (setf (size-width size) width)

;; set angle
            (setf (orientation-y (io-orientation wall))
 5            (i- 900
                 (the fixnum
                    (trunc (f* 1800.0
                                (f/ (my-atan width lens-z)
10                                  my-pi))))))

;; set stretch factor
            (setf (float-value (io-stretch wall))
              (f/ (my-sqrt (f+ (f* width width)
15                             (f* lens-z lens-z)))
                  width))

;; set plane equations
            (setf (plane-a (io-left-plane wall)) 1.0)
            (setf (plane-d (io-left-plane wall)) (f- 0.0 lens-right))
20
            (setf (plane-a (io-bottom-plane wall)) lens-bottom)
            (setf (plane-b (io-bottom-plane wall)) (f- *l-xmax*
                                                       lens-right))
            (setf (plane-d (io-bottom-plane wall))
25            (f- 0.0 (f* lens-bottom *l-xmax*)))

(setq aa (f- *l-ymax* lens-top)
                  bb (f- lens-right *l-xmax*))
            (setf (plane-a (io-top-plane wall)) aa)
30          (setf (plane-b (io-top-plane wall)) bb)
            (setf (plane-d (io-top-plane wall))
              (f- 0.0 (f+ (f* aa *l-xmax*) (f* bb *l-ymax*))))

;;----------- Bottom Wall -----------
35          (setq wall bottom-wall)
            (setq position (io-position wall)
                  size (io-size wall))

;; set position and size
40          (setf (size-height size) lens-bottom)

;; set angle
            (setf (orientation-x (io-orientation wall))
              (the fixnum
45              (trunc (f* 1800.0
                           (f/ (my-atan lens-z lens-bottom)
                               my-pi)))))

;; set stretch factor
50          (setf (float-value (io-stretch wall))
              (f/ (my-sqrt (f+ (f* lens-bottom lens-bottom)
                               (f* lens-z lens-z)))
                  lens-bottom))

55          ;; set plane equations
            (setf (plane-b (io-top-plane wall)) -1.0)
            (setf (plane-d (io-top-plane wall)) lens-bottom)
```

```
                              28
        (setf (plane-a (io-left-plane wall)) lens-bottom)
        (setf (plane-b (io-left-plane wall)) (f- 0.0 lens-left))

5     (setf (plane-a (io-right-plane wall)) (f- 0.0 lens-bottom))
        (setf (plane-b (io-right-plane wall)) (f- lens-right
                                                  *l-xmax*))
        (setf (plane-d (io-right-plane wall)) (f* lens-bottom
                                                  *l-xmax*))

10     ;;---------- Top Wall -----------
        (setq wall top-wall)
        (setq position (io-position wall)
              size (io-size wall))

15     ;; set position and size
        (setf (point-y position) (f+ (point-y lens-position)
                                     lens-height))
        (setf (point-z position) (point-z lens-position))
        (setq height (f- *l-ymax* lens-top))
 20     (setf (size-height size) height)

;; set angle
        (setf (orientation-x (io-orientation wall))
              (i- (the fixnum
 25                    (trunc (f* 1800.0
                                  (f/ (my-atan height lens-z)
                                      my-pi))))
                  900))

30     ;; set stretch factor
        (setf (float-value (io-stretch wall))
              (f/ (my-sqrt (f+ (f* height height)
                               (f* lens-z lens-z)))
                  height))
 35
        ;; set plane equations
        (setf (plane-b (io-bottom-plane wall)) 1.0)
        (setf (plane-d (io-bottom-plane wall)) (f- 0.0 lens-top))

40     (setf (plane-a (io-left-plane wall)) (f- *l-ymax* lens-top))
        (setf (plane-b (io-left-plane wall)) lens-left)
        (setf (plane-d (io-left-plane wall)) (f- 0.0 (f* lens-left
 *l-ymax*)))

45     (setq aa (f- lens-top *l-ymax*)
              bb (f- *l-xmax* lens-right))
        (setf (plane-a (io-right-plane wall)) aa)
        (setf (plane-b (io-right-plane wall)) bb)
        (setf (plane-d (io-right-plane wall))
 50           (f- 0.0 (f+ (f* aa *l-xmax*) (f* bb *l-ymax*))))
        ))
    t)

(defun Make-3D-Lens-Wall-IO (title &rest keyword-pairs &key
 55                                     &allow-other-keys)
      (declare (dynamic-extent keyword-pairs))
      (apply #'make-instance '3d-lens-wall-io
```

```
                                  29
                :title title
                :display-title-p nil
                :allow-other-keys t
                keyword-pairs))
5
        (defmethod draw-io ((item 3d-lens-wall-io) picking)
          (ig:pushmatrix)
          (ig:translate 0.0 0.0 0.2)
          (with-3d-item-positioned item
10          (ig:pushmatrix)

(let ((which (io-which item)))
              (case which
                (:top
15                (ig:scale 1.0 (float-value (io-stretch item)) 1.0)
                  (ig:translate 0.0 (f- 0.0 (point-y position)) 0.0)
                  (ig:clipplane 0 ig::cp_define (io-left-plane item))
                  (ig:clipplane 1 ig::cp_define (io-right-plane item))
                  (ig:clipplane 2 ig::cp_define (io-bottom-plane item))
20                (ig:clipplane 0 ig::cp_on nil)
                  (ig:clipplane 1 ig::cp_on nil)
                  (ig:clipplane 2 ig::cp_on nil))

(:bottom
25                (ig:translate 0.0 0.0 0.0)
                  (ig:scale 1.0 (float-value (io-stretch item)) 1.0)
                  (ig:clipplane 0 ig::cp_define (io-left-plane item))
                  (ig:clipplane 1 ig::cp_define (io-right-plane item))
                  (ig:clipplane 2 ig::cp_define (io-top-plane item))
30                (ig:clipplane 0 ig::cp_on nil)
                  (ig:clipplane 1 ig::cp_on nil)
                  (ig:clipplane 2 ig::cp_on nil))

(:left
35                (ig:translate 0.0 0.0 0.0)
                  (ig:scale (float-value (io-stretch item)) 1.0 1.0)
                  (ig:clipplane 1 ig::cp_define (io-bottom-plane item))
                  (ig:clipplane 2 ig::cp_define (io-right-plane item))
                  (ig:clipplane 3 ig::cp_define (io-top-plane item))
40                (ig:clipplane 1 ig::cp_on nil)
                  (ig:clipplane 2 ig::cp_on nil)
                  (ig:clipplane 3 ig::cp_on nil))

(:right
45                (ig:scale (float-value (io-stretch item)) 1.0 1.0)
                  (ig:translate (f- 0.0 (point-x position)) 0.0 0.0)
                  (ig:clipplane 0 ig::cp_define (io-left-plane item))
                  (ig:clipplane 1 ig::cp_define (io-bottom-plane item))
                  (ig:clipplane 3 ig::cp_define (io-top-plane item))
50                (ig:clipplane 0 ig::cp_on nil)
                  (ig:clipplane 1 ig::cp_on nil)
                  (ig:clipplane 3 ig::cp_on nil)))

;; NOTE: could make interaction faster by not drawing background
55          ;; of wall, but user's don't seem to like this.
            (ig:c3i +white+)
            (with-decaling
```

```
                                    30
        picking
        (ig:rectf 0.0 0.0 *l-xmax* *l-ymax*)
        (progn
           (ig:rectf 0.0 0.0 *l-xmax* *l-ymax*)
5          (when (not picking)
              (draw-lens-text which)))))

(ig:clipplane 0 ig::cp_off nil)
      (ig:clipplane 1 ig::cp_off nil)
10    (ig:clipplane 2 ig::cp_off nil)
      (ig:clipplane 3 ig::cp_off nil)

(ig:popmatrix)
      )
15    (ig:popmatrix)
      nil)

;;===============================================================
  ;;
20 ;; Reading the File
  ;;

(defun Compute-General-Layout (n-items total-width total-height
   aspect-ratio
25                                 min-horizontal-offset
   min-vertical-offset)
     "returns item-height, item-width, horizontal-offset,
   vertical-offset,
      and items-per-row"
30   (let* ((total-aspect-ratio (/ (* 1.0 total-width)
                                   (* 1.0 total-height)))
          (aspect-ratio-ratio (/ total-aspect-ratio aspect-ratio))
          (horizontal-offset min-horizontal-offset)
          (vertical-offset min-vertical-offset)
35        (cols 1.0)
          (rows 1.0)
          (done nil)
          (item-width 1.0)
          (item-height 1.0))
40     (if (> aspect-ratio-ratio 1.0)
         (do () (done)
           (setq rows (truncate cols aspect-ratio-ratio))
           (if (and (>= rows 1.0)
                    (>= (* rows cols) n-items))
45            (setq done t)
             (setq cols (+ cols 1.0))))
         (do () (done)
           (setq cols (* rows aspect-ratio-ratio))
           (if (and (>= cols 1.0)
50                  (>= (* rows cols) n-items))
             (setq done t)
             (setq rows (+ rows 1.0)))))

(setq cols (round cols))
55    (setq rows (truncate (+ n-items cols -1) cols))
      (setq item-width (/ (- total-width (* cols horizontal-offset)
                             horizontal-offset)
```

31

```
                                       cols))
            (setq item-height (/ item-width aspect-ratio))
            (setq vertical-offset (/ (- total-height (* item-height rows))
 5                                   (+ rows 1)))

(values item-height item-width horizontal-offset vertical-offset
                    (round cols))))

(eval-when (compile load eval)
10      (proclaim '(fixnum *Lens-Text-Array-Index* *Lens-Text-Array-Length*
                           *Lens-Lines-Per-Page* *Lens-N-Pages*
                           *Lens-Pages-per-row*))
        (proclaim '(single-float *Lens-Font-Scale*
                    *Lens-Page-Width* *Lens-Page-Height*
15                  *Lens-Horizontal-Offset* *Lens-Vertical-Offset*)))

(defvar *Lens-Text-Array-Index* 0)
      (defvar *Lens-Text-Array-Length* 0)
      (defvar *Lens-Text-Array* nil)
20    (defvar *Lens-Search-Array* nil)

(defvar *Lens-Lines-Per-Page* 78)
      (defvar *Lens-N-Pages* 0)
      (defvar *Lens-Page-Height* 0.0)
25    (defvar *Lens-Page-Width* 0.0)
      (defvar *Lens-Horizontal-Offset* 0.0)
      (defvar *Lens-Vertical-Offset* 0.0)
      (defvar *Lens-Pages-per-row* 0)

30    (defvar *Lens-Font-Scale* 1.0)

(defun Lens-Read-File (filename)
        (when (zerop (length filename))
          (setq *lens-n-pages* 0)
35        (return-from Lens-Read-File nil))

(when (zerop *Lens-Text-Array-Length*)
          (setq *Lens-Text-Array-Length* 50
                *Lens-Text-Array* (make-array *Lens-Text-Array-Length*
40                                            :initial-element nil)))
          (setq *Lens-Text-Array-Index* 0)

(with-cursor *Hourglass-Cursor*
          (if (not (ignore-errors (probe-file filename)))
45            (iv-error "file does not exist")
            (with-open-file (file filename :direction :input)
              (do ((line (read-line file nil nil) (read-line file nil nil)))
                  ((null line))
                (setf (svref *Lens-Text-Array* *Lens-Text-Array-Index*)
50    line)
                (incf *Lens-Text-Array-Index*)
                (when (>= *Lens-Text-Array-Index* *Lens-Text-Array-Length*)
                  (let (new (old *Lens-Text-Array*))
                    (setq *Lens-Text-Array-Length*
55                        (i+ *Lens-Text-Array-Length*
                              *Lens-Text-Array-Length*))
                    (setq new (make-array *Lens-Text-Array-Length*
```

```
                                                  32
                                              :initial-element nil))
                    (my-dotimes (i *Lens-Text-Array-Index*)
                      (setf (svref new i) (svref old i)))
                    (setq *Lens-Text-Array* new)))
 5          ))))

(when (zerop *Lens-Text-Array-Index*)
          (setq *Lens-N-Pages* 0)
          (return-from lens-read-file nil))
10
        (setq *Lens-N-Pages* (ceiling *Lens-Text-Array-Index*
                                      *Lens-Lines-Per-Page*))
        (multiple-value-setq (*Lens-Page-Height*
                              *Lens-Page-Width*
15                            *Lens-Horizontal-Offset*
                              *Lens-Vertical-Offset*
                              *Lens-Pages-per-row*)
          (compute-general-layout *Lens-N-Pages* *l-xmax* *l-ymax*
                                  (f/ *VFont-Width* *VFont-Height*)
20                                2.0 2.0))

(setq *Lens-Font-Scale*
              (f/ *Lens-Page-Width* (f* *VFont-Width* 80.0)))
        (when (or (null *Lens-Search-Array*)
25                (/= (length *Lens-Search-Array*)
       *Lens-Text-Array-Length*))
          (setq *Lens-Search-Array*
            (make-array *Lens-Text-Array-Length* :element-type 'bit
                        :initial-element 0)))
30      t)

;;==============================================================
     ;;
35   ;; Draw the grid
     ;;

(defun Draw-Grid ()
       (let* ((xlines 40)
40              (ylines 30)
                (xinc (f/ *l-xmax* xlines))
                (yinc (f/ *l-ymax* ylines))
                (x xinc) (y yinc))
         (declare (fixnum xlines ylines)
45                (single-float xinc yinc x y))

;; Draw grid lines
         (ig:rgbcolor 0 0 100)
         (my-dotimes (i (i- xlines 1))
50         (ig:bgnline)
           (ig:v2f-coord x 0.0)
           (ig:v2f-coord x *l-ymax*)
           (ig:endline)
           (setq x (f+ x xinc)))
55       (my-dotimes (i (i- ylines 1))
           (ig:bgnline)
           (ig:v2f-coord 0.0 y)
```

```
                                         33
            (ig:v2f-coord *l-xmax* y)
            (ig:endline)
            (setq y (f+ y yinc)))
      )
 5    t)

;;=========================================================
      ;;
      ;; Draw the text
10    ;;

;; NOTE: This assumes that the point x1,y1 is below x2,y2
      (defmacro Pt-Left-Of-Line (x y x1 y1 x2 y2)
        `(> (f* (f- ,x ,x2) (f- ,y1 ,y2))
15          (f* (f- ,y ,y2) (f- ,x1 ,x2))))

;; NOTE: This assumes that the point x1,y1 is below x2,y2
      (defmacro Pt-Right-Of-Line (x y x1 y1 x2 y2)
        `(< (f* (f- ,x ,x2) (f- ,y1 ,y2))
20          (f* (f- ,y ,y2) (f- ,x1 ,x2))))

(defvar *Lens-Text-Descriptor*
        (make-array 2 :element-type 'fixnum :initial-contents '(0 78)))

25    (defun Draw-Lens-Text (surface &optional (doculling t))
        (when (zerop *Lens-N-Pages*)
          (draw-grid)

;; Write some text
30        (ig:c3i +black+)
          (ig:pushmatrix)
          (ig:translate (f/ *l-xmax* 2.0) (f/ *l-ymax* 2.0) 0.0)
          (ig:scale 0.1 0.1 0.1)
          (charstrv "Read me if you can.")
35        (ig:popmatrix)

(ig:pushmatrix)
          (ig:translate (f/ *l-xmax* 3.0) (f/ *l-ymax* 3.0) 0.0)
          (ig:scale 0.05 0.05 0.05)
40        (charstrv "This is even smaller.")
          (ig:popmatrix)

(return-from draw-lens-text nil))
45    ;; Draw all the text
      (let* ((draw-it t)
             (filename-obj (find-Interactive-Object "File:"))
             (search-obj (find-Interactive-Object "Search:"))
50           (draw-all (not
                        (and *Current-Interactive-Object*
                             (or (eq *Current-Interactive-Object*
                                     filename-obj)
                                 (eq *Current-Interactive-Object*
55                                   search-obj)))))
             (highlight nil)
             (greek (or *Lens-Greek* (do-greek)))
```

```
                              34
              (page -1) (line (i- *lens-lines-per-page* 1))
              (page-left *Lens-Horizontal-Offset*)
              (page-top (f- *l-ymax* *Lens-Vertical-Offset*))
              (page-right 0.0)
   5          (page-bottom *l-ymax*)
              (line-height (f* *VFont-Height* *Lens-Font-Scale*))
              (half-line-height (f/ line-height 2.0))
              (char-width (f* *VFont-Width* *Lens-Font-Scale*))
              (x 0.0) (y 0.0)
  10          (lens-position (io-position *lens*))
              (lens-size (io-size *lens*))
              (lens-width (size-width lens-size))
              (lens-height (size-height lens-size))
              (lens-left (point-x lens-position))
  15          (lens-bottom (point-y lens-position))
              (lens-right (f+ lens-left lens-width))
              (lens-top (f+ lens-bottom lens-height)))
          (declare (fixnum page line)
                   (single-float x y page-left page-right page-top
  20                             page-bottom line-height half-line-height
                                 char-width lens-width lens-height lens-left
                                 lens-right lens-top lens-bottom))
          (ig:c3i +black+)
          (my-dotimes (i *Lens-Text-Array-Index*)
  25        (setq line (i+ line 1))
            (when (= line *lens-lines-per-page*)
              ;; new page
              (setq page (i+ page 1))
              (setq line 0)
  30          (setq page-left (f+ page-right *Lens-Horizontal-Offset*))

(when (= page *Lens-Pages-per-row*)
                ;; new row
                (setq page 0)
  35            (setq page-top (f- page-bottom *Lens-Vertical-Offset*)
                      page-left *Lens-Horizontal-Offset*))

(setq page-right (f+ page-left *Lens-Page-Width*)
  40                page-bottom (f- page-top *Lens-Page-Height*)))

(setq draw-it t)
            (when doculling
              (case surface
                (:top    (when (or (< page-top lens-top)
  45                               (Pt-Right-Of-Line page-left page-top
                                                    lens-right lens-top
                                                    *l-xmax* *l-ymax*)
                                   (Pt-Left-Of-Line page-right page-top
  50                                                lens-left lens-top
                                                    0.0 *l-ymax*))
                           (setq draw-it nil)))
                (:bottom (when (or (> page-bottom lens-bottom)
                                   (Pt-Right-Of-Line page-left page-bottom
  55                                                 *l-xmax* 0.0
                                                     lens-right
                                                     lens-bottom)
                                   (Pt-Left-Of-Line page-right page-bottom
```

35

```
                                                                   0.0 0.0
                                                                   lens-left
                                                                   lens-bottom))
                             (setq draw-it nil)))
          (:left    (when (or (> page-left lens-left)
                              (Pt-Right-Of-Line page-left page-bottom
                                                lens-left lens-top
                                                0.0 *l-ymax*)
                              (Pt-Right-Of-Line page-left page-top
                                                0.0 0.0
                                                lens-left
                                                lens-bottom))
                             (setq draw-it nil)))
          (:right   (when (or (< page-right lens-right)
                              (Pt-Left-Of-Line page-right page-bottom
                                               lens-right lens-top
                                               *l-xmax* *l-ymax*)
                              (Pt-Left-Of-Line page-right page-top
                                               *l-xmax* 0.0
                                               lens-right
                                               lens-bottom))
                             (setq draw-it nil)))
          (:lens    (when (or (> page-bottom lens-top)
                              (> page-left lens-right)
                              (< page-right lens-left)
                              (< page-top lens-bottom))
                       (setq draw-it nil)))))

(when draw-it
       (ig:bgnline)
       (ig:v2f-coord page-left page-top)
       (ig:v2f-coord page-right page-top)
       (ig:v2f-coord page-right page-bottom)
       (ig:v2f-coord page-left page-bottom)
       (ig:v2f-coord page-left page-top)
       (ig:endline))

(setq x (f+ page-left char-width)
           y (f- page-top (f+ line-height line-height))))
     ;; draw text line
     (when (and draw-it draw-all)
       (setq highlight (and (> *Lens-Search-Count* 0)
                            (= (aref (the (simple-array bit (*))
                                          *lens-search-array*) i)
                               1)))
       (when highlight
         (ig:c3i +red+))
       (if (or (not greek)
               (and (eq surface :lens)
                    (or (not doculling)
                        (and (>= y lens-bottom)
                             (<= (f- y line-height) lens-top)))))
         (progn   ;; Display the text
           (ig:pushmatrix)
           (ig:translate x y 0.0)
           (ig:scale *Lens-Font-Scale* *Lens-Font-Scale*
```

36
```
                     *Lens-Font-Scale*)
             (charstrv (svref *Lens-Text-Array* i)
                       *Lens-Text-Descriptor*)
             (ig:popmatrix))

(let* ((str (svref *Lens-Text-Array* i))
                  (l (length str))
                  (line-width 0.0)
                  (yl (f+ y half-line-height)))
             ;; Greek the text
             (declare (fixnum l)
                      (type (simple-array character (*)) str)
                      (single-float yl line-width))
             (if (> l 78) (setq l 78))
             (setq line-width (f* char-width l))
             (if highlight
                 (progn
                   (ig:bgnpolygon)
                   (ig:v2f-coord x y)
                   (ig:v2f-coord x yl)
                   (ig:v2f-coord (f+ x line-width) yl)
                   (ig:v2f-coord (f+ x line-width) y)
                   (ig:endpolygon))
                 (progn
                   (ig:bgnline)
                   (ig:v2f-coord x yl)
                   (ig:v2f-coord (f+ x line-width) yl)
                   (ig:endline)))
             ))
           (when highlight
             (ig:c3i +black+)))
       (setq y (f- y line-height))
       ))
   t)

;;=================================================================
;;
;; String Search
;;

(defun lens-search (s)
  (setq *Lens-Search-Count* 0)

(when (zerop (length (the (simple-array character (*)) s)))
    (my-dotimes (i *lens-text-array-index*)
      (setf (aref (the (simple-array bit (*))
                       *Lens-Search-Array*) i)
            0))
    (return-from lens-search nil))

(with-cursor *Hourglass-Cursor*
    (let* ((found-it nil)
           (text nil)
           (len1 (length (the (simple-array character (*)) s)))
           (len2 0)
           (k2 0))
      (declare (fixnum len1 len2 k2))
```

```
                            37
    (my-dotimes (i *lens-text-array-index*)
     ;; Search string
     (setq found-it nil)
     (setq text (svref *Lens-Text-Array* i))
 5   (setq len2 (length (the (simple-array character (*)) text)))
     (block string-search
        (my-dotimes (k len2)
           (when
              (block string-equal-search
10               (my-dotimes (l len1)
                    (setq k2 (i+ l k))
                    (when (or (>= k2 len2)
                              (not (char-equal
15                                    (char (the (simple-array character
                                                                  (*)) s)
                                          1)
                                    (char (the (simple-array character
                                                                  (*))
20                                                                  text)
                                          k2))))
                       (return-from string-equal-search
                          nil)))
              t)
25            (setq found-it t)
              (incf *Lens-Search-Count*)
              (return-from string-search t))))
        (setf (aref (the (simple-array bit (*))
30                        *Lens-Search-Array*) i)
              (if found-it 1 0)))))
     t)

(defun Build-Lens-Room ()
35    (setq *l-room*
           (make-3d-room
              l-room-name
              :required-files '("Lens")
              :size (make-3d-size :width *l-xmax* :height *l-ymax*
40                                 :depth *l-zmax*)
              :eye-home (make-3d-point :x (/ *l-xmax* 2.0)
                                        :y (/ *l-ymax* 2.0)
                                        :z (* *l-zmax* 0.5))
              :dob-home (make-3d-point :x 0.0 :y 0.0 :z -48.0)
45            :dog-home (make-3d-point :x 0.0 :y 0.0 :z -48.0)
              :fovy 350

:front-wall-colors
              (make-corner-colors :ll +white+
50                                 :ul +white+
                                   :ur +white+
                                   :lr +white+)

:left-wall-colors
55            (make-corner-colors :ll +lens-wall-light+
                                   :ul +lens-wall-dark+
                                   :ur +lens-wall-dark+
```

```
                                      38
                                 :lr +lens-wall-light+)
              :right-wall-colors
              (make-corner-colors :ll +lens-wall-light+
                                  :ul +lens-wall-dark+
                                  :ur +lens-wall-dark+
                                  :lr +lens-wall-light+)
              :back-wall-colors
              (make-corner-colors :ll +lens-wall-light+
                                  :ul +lens-wall-dark+
                                  :ur +lens-wall-dark+
                                  :lr +lens-wall-light+)
              :floor-colors
              (make-corner-colors :ll +lens-wall-light+
                                  :ul +lens-wall-light+
                                  :ur +lens-wall-light+
                                  :lr +lens-wall-light+)
              :ceiling-colors
              (make-corner-colors :ll +lens-wall-dark+
                                  :ul +lens-wall-dark+
                                  :ur +lens-wall-dark+
                                  :lr +lens-wall-dark+)
              :avg-step-time (make-float-box 0.031)
              ))

(rm-switch l-room-name)

(setq *lens*
    (Make-3D-Lens-IO
      "Lens"
      :home (make-3d-point :x 10.0 :y 10.0 :z 3.0)
      :home-orientation (make-orientation)
      :size (make-3d-size :width 20.0 :height 25.0)
      :font-scale 0.2
      :momentary t
      :Selectable-by-first-character nil))

(Make-3D-Lens-Wall-IO
    "Lens Left Wall"
    :which :left
    :home (make-3d-point :x 0.0 :y 0.0 :z 0.0)
    :home-orientation (make-orientation :y -450)
    :axis :left)

(Make-3D-Lens-Wall-IO
    "Lens Right Wall"
    :which :right
    :home (make-3d-point :x (f+ (point-x (io-position *lens*))
                                (size-width (io-size *lens*)))
                         :y 0.0 :z 0.0)
    :home-orientation (make-orientation :y 450)
    :axis :left)

(Make-3D-Lens-Wall-IO
    "Lens Top Wall"
    :which :top
    :home (make-3d-point :x 0.0
```

```
                                                       39
                                          :y (f+ (point-y (io-position *lens*))
                                                 (size-height (io-size *lens*)))
                                          :z 0.0)
                      :home-orientation (make-orientation :x -450)
        5             :axis :bottom)

(Make-3D-Lens-Wall-IO
                    "Lens Bottom Wall"
                    :which :bottom
       10           :home (make-3d-point :x 0.0 :y 0.0 :z 0.0)
                    :home-orientation (make-orientation :x 450)
                    :axis :bottom)

15          (Update-Lens-Walls)

(Make-3D-Button-IO
                    "Zoom"
                    :home (make-3d-point :x 1.0 :y 0.0 :z 12.0)
       20           :home-orientation (make-orientation :x -900)
                    :font-scale 0.4
                    :Selectable-by-first-character t
                    :click-action '(lambda (item)
                                      (declare (ignore item))
       25                             (window-zoom)))

(Make-3D-Filename-IO
                    "File:"
                    :default-answer *Lens-Filename*
       30           :home (make-3d-point :x 18.0 :y 0.0 :z 12.0)
                    :home-orientation (make-orientation :x -900)
                    :heads-up-orientation (make-orientation :x 0)
                    :heads-up t
                    :heads-up-tied-to-gaze :On-Keyboard-Selection
       35           :axis :bottom
                    :font-scale 0.4
                    :max-chars-displayed 20
                    :set-action
                    '(lambda (item s)
       40              item
                       (when (not (string-equal s *Lens-Filename*))
                         (lens-read-file s)
                         (setq *Lens-Filename* s)
                         (setq *Lens-Search-String* "")
       45                (lens-search "")
                         (let ((search-obj (find-Interactive-Object "Search:")))
                            (when search-obj
                              (Set-Interactive-Object-Current-Answer search-obj "")))))
                    :Selectable-by-first-character t)
       50
                   (Make-3D-Editable-Text-IO
                    "Search:"
                    :default-answer *Lens-Search-String*
       55           :home (make-3d-point :x 90.0 :y 0.0 :z 12.0)
                    :home-orientation (make-orientation :x -900)
                    :heads-up-orientation (make-orientation :x 0)
                    :heads-up t
```

```
                              40
      :heads-up-tied-to-gaze :On-Keyboard-Selection
      :axis :bottom
      :font-scale 0.4
      :max-chars-displayed 10
 5    :set-action
      '(lambda (item s)
         item
         (when (not (string-equal s *Lens-Search-String*))
           (lens-search s)
10         (setq *Lens-Search-String* s)))
      :Selectable-by-first-character t)

;; force save/restore state
   (rm-switch l-room-name :forced t)
15 t)

(eval-when (load)
   (Add-Build-Room-Function l-room-name #'Build-Lens-Room))
```

We claim:

1. A method for displaying an image on a display surface, preserving context and detail information even when the image contains too much detail to be displayed all at once on the display surface, comprising the steps of:

storing a data block representing objects appearing in the image, wherein a full image is an image generated from said data block without loss of information;

defining, in a 3-D space, a viewpoint in the 3-D space;

defining a viewing surface in the 3-D space corresponding to the display surface;

defining an image surface in the 3-D space, wherein the image surface comprises a top face and a plurality of side faces of a truncated pyramid, the top face being nearer to the viewpoint than the plurality of side faces and the truncated pyramid being a shape realizable in the 3-D space;

determining a position of a lens panel on the image;

determining the extent of side panels, wherein a side panel is defined by a quadrilateral with one edge coincident with an edge of the lens panel and an opposite edge coincident with an edge of the image;

rendering said lens panel onto said top face and said side panels onto said side faces to form a rendered image providing a detailed view of image portions under said lens panel and context views of image portions under said plurality of side panels.

2. The method of claim 1, wherein the objects are text characters, lines of characters, and pages of lines, and the image is a document.

3. The method of claim 1, wherein the objects are nodes and lines, and the image is a map.

4. The method of claim 1, wherein said step of defining said image surface comprises the steps of:

determining a magnification factor of image portions under said lens panel relative to bounds of said full image; and setting a height of said truncated pyramid in the 3-D space such that a ratio of a distance from said viewpoint to a base of said truncated pyramid and a distance from said viewpoint to said top face of said truncated pyramid equals said magnification factor.

5. The method of claim 1, wherein said plurality of side panels are rendered onto said side faces in a lower resolution than the resolution with which the lens panel is rendered onto said top face.

6. The method of claim 5, wherein the image is a text document and said lower resolution is provided by using a greeked font for text in said plurality of side panels.

7. The method of claim 1, further comprising the step of moving said viewpoint when said top face would otherwise be out of view, by moving said viewpoint in a direction which results in said top face appearing nearer to the center of the display surface.

8. The method of claim 1, further comprising the steps of:

dividing the lens panel into a nested lens panel and four nested side panels; and rendering said nested lens onto a nested truncated pyramid atop said top face of said truncated pyramid.

9. The method of claim 1, wherein less than all of said plurality of side panels are visible on said display surface.

10. The method of claim 1, wherein said top surface is constrained to remain within a view defined by said viewing surface and said viewpoint.

11. A method of generating a display of an image such that the image is interactively scaled to preserve context and provide detail, the method comprising the steps of:

defining the image with a set of objects located within an image bounding rectangle on a base plane;

defining a rectangular portion of the image as a detail rectangle, the detail rectangle being within the image bounding rectangle and the detail rectangle having sides parallel to sides of said image bounding rectangle, the detail rectangle thereby defining four context trapezoids, a context trapezoid being a portion of said image bounding rectangle defined by an edge of said image bounding rectangle, a parallel edge of said detail rectangle nearest said edge of said image bounding rectangle, and lines drawn between edges of said image bounding rectangle and said parallel edge;

determining, from interactive user input, a lens magnification factor;

mapping a base of a truncated pyramid in a 3-D space;

defining a viewpoint in the 3-D space;

calculating a position of a top face of said truncated pyramid in a 3-D space such that the ratio of the distance from the viewpoint to said base and the distance from a top face of the truncated pyramid to said viewpoint is equal to said lens magnification factor, wherein the ratio of the size of said top face relative to said base is the ratio of said detail rectangle to said image bounding rectangle;

mapping said detail rectangle onto said top face and said context trapezoids onto side faces of said truncated pyramid, the truncated pyramid being a shape realizable in the 3-D space; and rendering said set of objects according to results of said step of mapping, thereby generating a detailed view of portions the image in said detail rectangle and a context view of portions of the image in said context trapezoids.

12. The method of claim 11, further comprising the steps of:

determining, from interactive user input, a detail rectangle position and a top face position; and constraining said top face position such that all of said top face is visible in a display window when each edge of said base is visible in said display window, regardless of said detail rectangle position or said lens magnification factor.

13. The method of claim 11, wherein said step of rendering is different for said detail rectangle and said context trapezoids, rendering for a context trapezoid being of a lower resolution than rendering for said detail rectangle.

14. An apparatus for generating a display of an image which preserves context of the image when the image cannot be displayed on a display surface without some loss of information, the apparatus comprising:

image input means for accepting a plurality of object representations representing the image;

user input means for interactively accepting a lens panel size and position in a 3-D space, the 3-D space including a display plane, a portion of which represents the display surface, and a viewpoint;

matrix calculation means, coupled to said user input means, for calculating a transformation matrix for mapping a detailed region of the image to said lens panel and transformation matrices for mapping context regions of the image onto side panels of a truncated pyramid defined in the 3-D space by said lens panel and a base rectangle, the truncated pyramid being a shape realizable in the 3-D space;

constraint means for constraining said lens panel to remaining in view of said viewpoint through said portion of the display surface;

rendering means for rendering said objects representing the image onto said side panels and lens panel of said truncated pyramid; and a display driver, coupled to receive a projection of the rendered truncated pyramid onto the display surface, where said display driver provides a pixel array to the display to allow the display to illuminate pixels of the display according to values in said pixel array.

15. The apparatus of claim 14, wherein said lens panel is positioned in the 3-D space so as to result in a display of substantially all information content of the image within said lens panel.

* * * * *